US012613571B2

(12) United States Patent
Rockel

(10) Patent No.: US 12,613,571 B2
(45) Date of Patent: Apr. 28, 2026

(54) USER INTERFACES FOR BREATH TRACKING

(71) Applicant: Apple Inc., Cupertino, CA (US)

(72) Inventor: Philipp Rockel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/002,389

(22) Filed: Dec. 26, 2024

(65) Prior Publication Data

US 2025/0377714 A1 Dec. 11, 2025

Related U.S. Application Data

(60) Provisional application No. 63/657,919, filed on Jun. 9, 2024.

(51) Int. Cl.
*G06F 3/01* (2006.01)

(52) U.S. Cl.
CPC .................................... *G06F 3/011* (2013.01)

(58) Field of Classification Search
None
See application file for complete search history.

(56) References Cited

U.S. PATENT DOCUMENTS

| | | | |
|---|---|---|---|
| 7,199,700 | B1 | 4/2007 | Mcpherson et al. |
| 8,562,489 | B2 | 10/2013 | Burton et al. |
| 10,080,530 | B2 | 9/2018 | Cheng et al. |
| 11,931,625 | B2 | 3/2024 | D'Auria et al. |
| 2003/0171643 | A1 | 9/2003 | Noguchi et al. |
| 2004/0254501 | A1 | 12/2004 | Mault |
| 2005/0165609 | A1 | 7/2005 | Zuberec et al. |
| 2007/0129883 | A1 | 6/2007 | Kuo et al. |
| 2007/0208269 | A1 | 9/2007 | Mumford et al. |
| 2008/0072902 | A1 | 3/2008 | Setzer et al. |
| 2008/0319279 | A1 | 12/2008 | Ramsay et al. |
| 2009/0024047 | A1 | 1/2009 | Shipley et al. |
| 2009/0227425 | A1 | 9/2009 | Shirasaki et al. |
| 2009/0263773 | A1 | 10/2009 | Kotlyar et al. |
| 2009/0322686 | A1 | 12/2009 | Jayasinghe |
| 2010/0011307 | A1 | 1/2010 | Desfossez et al. |
| 2010/0035669 | A1 | 2/2010 | Jang et al. |
| 2010/0069774 | A1 | 3/2010 | Bingham et al. |
| 2010/0095961 | A1 | 4/2010 | Tornesel et al. |

(Continued)

FOREIGN PATENT DOCUMENTS

| | | | |
|---|---|---|---|
| AU | 2014337787 | A1 | 5/2016 |
| CN | 101822894 | A | 9/2010 |

(Continued)

OTHER PUBLICATIONS

Advisory Action received for U.S. Appl. No. 15/372,133, mailed on Aug. 28, 2019, 7 pages.

(Continued)

*Primary Examiner* — Aneeta Yodichkas
(74) *Attorney, Agent, or Firm* — YHE Law LLP

(57) ABSTRACT

User interfaces for breath tracking are described. In some embodiments, a user interface for breath tracking includes displaying particles with lighting characteristics that change over time. In some embodiments, a user interface includes displaying particles that move based on whether a condition is met.

30 Claims, 27 Drawing Sheets

(56) References Cited

U.S. PATENT DOCUMENTS

| | | | |
|---|---|---|---|
| 2010/0273610 A1 | 10/2010 | Johnson | |
| 2010/0331145 A1 | 12/2010 | Lakovic et al. | |
| 2011/0138311 A1 | 6/2011 | Palmer | |
| 2012/0015778 A1 | 1/2012 | Lee et al. | |
| 2013/0139107 A1 | 5/2013 | Jung | |
| 2013/0333703 A1 | 12/2013 | Wallace et al. | |
| 2014/0018049 A1 | 1/2014 | Cannon et al. | |
| 2014/0316191 A1 | 10/2014 | De Zambotti et al. | |
| 2014/0344375 A1 | 11/2014 | Hauser et al. | |
| 2015/0096564 A1 | 4/2015 | Cosnek | |
| 2015/0238722 A1 | 8/2015 | Al-Ali | |
| 2015/0283337 A1 | 10/2015 | Adams et al. | |
| 2015/0342518 A1 | 12/2015 | Persidsky et al. | |
| 2016/0007911 A1 | 1/2016 | Wu et al. | |
| 2016/0058337 A1 | 3/2016 | Blahnik et al. | |
| 2016/0114213 A1 | 4/2016 | Lee | |
| 2017/0243508 A1 | 8/2017 | Cheng et al. | |
| 2017/0332972 A1 | 11/2017 | Nagasaki et al. | |
| 2017/0354795 A1 | 12/2017 | Blahnik et al. | |
| 2018/0329584 A1 | 11/2018 | Williams et al. | |
| 2019/0035293 A1 | 1/2019 | Mei | |
| 2019/0314641 A1 | 10/2019 | Malchano et al. | |
| 2019/0320939 A1 | 10/2019 | Orvis et al. | |
| 2020/0149921 A1 | 5/2020 | Hoffman et al. | |
| 2020/0265744 A1 | 8/2020 | Lim et al. | |
| 2021/0113116 A1 | 4/2021 | Chen et al. | |
| 2021/0286502 A1 | 9/2021 | Lemay et al. | |
| 2021/0338971 A1 | 11/2021 | Blahnik et al. | |
| 2022/0080261 A1 | 3/2022 | Li | |
| 2022/0160276 A1 | 5/2022 | Suzuki et al. | |
| 2022/0374106 A1 | 11/2022 | Arney et al. | |
| 2023/0306695 A1* | 9/2023 | Rockel | G06F 3/017 |
| 2023/0347104 A1 | 11/2023 | Blahnik et al. | |
| 2024/0404210 A1 | 12/2024 | Rockel et al. | |

FOREIGN PATENT DOCUMENTS

| | | | |
|---|---|---|---|
| CN | 102488501 | A | 6/2012 |
| EP | 2311533 | A1 | 4/2011 |
| EP | 2866103 | A2 | 4/2015 |
| JP | 2003-305094 | A | 10/2003 |
| JP | 2007-190275 | A | 8/2007 |
| JP | 2007-190276 | A | 8/2007 |
| JP | 2009-119068 | A | 6/2009 |
| JP | 2010-104456 | A | 5/2010 |
| JP | 2010-533541 | A | 10/2010 |
| JP | 2012-19852 | A | 2/2012 |
| JP | 2012-35055 | A | 2/2012 |
| JP | 2012-524638 | A | 10/2012 |
| JP | 2012-524639 | A | 10/2012 |
| JP | 2013-131215 | A | 7/2013 |
| JP | 2018-504159 | A | 2/2018 |
| KR | 10-2010-0024503 | A | 3/2010 |
| KR | 10-2013-0142412 | A | 12/2013 |
| KR | 10-2014-0138361 | A | 12/2014 |
| WO | 2004/082751 | A1 | 9/2004 |
| WO | 2005/018737 | A1 | 3/2005 |
| WO | 2008/110956 | A1 | 9/2008 |
| WO | 2009/002577 | A1 | 12/2008 |
| WO | 2012/117376 | A1 | 9/2012 |
| WO | 2014/107795 | A1 | 7/2014 |
| WO | 2015/039979 | A1 | 3/2015 |
| WO | 2018/209152 | A1 | 11/2018 |
| WO | 2022/212070 | A1 | 10/2022 |

OTHER PUBLICATIONS

Advisory Action received for U.S. Appl. No. 15/372,133, mailed on Jun. 02. 2020, 5 pages.

Advisory Action received for U.S. Appl. No. 17/550,806, mailed on Oct. 26, 2023, 6 pages.

All Thingsgizmo, “How to Multitask on the Apple Watch”, Available Online at: https://www.youtube.com/watch?v=Mxt2tfABwLg, Jul. 12, 2015, 2 pages.

Applicant-Initiated Interview Summary received for U.S. Appl. No. 15/372,133, mailed on Dec. 23, 2019, 6 pages.

Applicant-Initiated Interview Summary received for U.S. Appl. No. 15/372,133, mailed on May 4, 2020, 5 pages.

Applicant-Initiated Interview Summary received for U.S. Appl. No. 15/372,133, mailed on Nov. 12, 2020, 5 pages.

Applicant-Initiated Interview Summary received for U.S. Appl. No. 17/345,092, mailed on Feb. 28, 2023, 5 pages.

Applicant-Initiated Interview Summary received for U.S. Appl. No. 17/550,806. mailed on Apr. 21, 2023, 2 pages.

Applicant-Initiated Interview Summary received for U.S. Appl. No. 17/550,806, mailed on Sep. 15, 2023, 2 pages.

Benson, Amanda, “Health App of the Month: Move, The Daily Activity Reminder”, Think Health, Retrieved from the internet: https://thinkhealth.priorityhealth.com/health-app-of-the-month-move-the-daily-activity-reminder/, Mar. 12, 2015, pp. 1-4.

“Breathe Deeply Now! for Windows Phone Version”, Online Available at: https://www.appx4fun.com/apps/5402/, Feb. 15, 2015, 11 pages.

Daniel About Tech, “Workout App Full Review! (Apple Watch)”, Available Online at: https://www.youtube.com/watch?v=aHXCNfSccoY, Feb. 19, 2019, 2 pages.

Decision to Grant received for Danish Patent Application No. PA201770384, mailed on Jun. 28, 2019, 2 pages.

Decision to Grant received for European Patent Application No. 17810736.3, mailed on Jan. 5, 2024, 2 pages.

Extended European Search Report received for European Patent Application No. 17810736.3, mailed Nov. 7, 2019, 10 pages.

Extended European Search Report received for European Patent Application No. 23216678.5, mailed on Mar. 7, 2024, 10 pages.

Final Office Action received for U.S. Appl. No. 15/372,133, mailed on Apr. 6, 2020, 16 pages.

Final Office Action received for U.S. Appl. No. 15/372,133, mailed on Apr. 18, 2019, 19 pages.

Final Office Action received for U.S. Appl. No. 17/550,806, mailed on Aug. 1, 2023, 21 pages.

Gil, Lory. “How to Use the Activity and Workout Apps on Apple Watch”, Online Available at: https://www.macrumors.com/how-to/apple-watch-activity-workout-apps/, May 4, 2015, 5 pages.

Hang et al., “Oh App, Where Art Thou? On App Launching Habits of Smartphone Users”, Proceedings of the 15th International conference on Human-computer interaction with mobile devices and services, MobileHCI’13, Online Available at: https://dl.acm.org/doi/10.1145/2493190.2493219, Aug. 27-30, 2013, 4 pages.

Intention to Grant received for Danish Patent Application No. PA201770384, mailed on Mar. 13, 2019. 2 pages.

Intention to Grant received for Danish Patent Application No. PA201770384, mailed on Nov. 14, 2018, 2 pages.

Intention to Grant received for European Patent Application No. 17810736.3, mailed on Aug. 8, 2023, 2 pages.

International Preliminary Report on Patentability received for PCT Patent Application No. PCT/US2017/035309, mailed on Dec. 20, 2018, 28 pages.

International Preliminary Report on Patentability received for PCT Patent Application No. PCT/US2022/030309, mailed on Nov. 30, 2023, 10 pages.

International Preliminary Report on Patentability received for PCT Patent Application No. PCT/US2023/015826, mailed on Oct. 3, 2024, 12 pages.

International Search Report and Written Opinion received for PCT Patent Application No. PCT/US2017/035309, mailed on Sep. 27, 2017, 31 pages.

International Search Report and Written Opinion received for PCT Patent Application No. PCT/US2022/030309, mailed on Sep. 15, 2022, 14 pages.

International Search Report and Written Opinion received for PCT Patent Application No. PCT/US2023/015826, mailed on Jul. 31, 2023, 18 pages.

International Search Report and Written Opinion received for PCT Patent Application No. PCT/US2024/030403, mailed on Sep. 9, 2024, 13 pages.

Invitation to Pay Additional Fee received for PCT Patent Application No. PCT/US2017/035309, mailed on Jul. 14, 2017, 2 pages.

(56) References Cited

OTHER PUBLICATIONS

Invitation to Pay Additional Fees and Partial International Search Report received for PCT Patent Application No. PCT/US2023/015826, mailed on Jun. 7, 2023, 10 pages.
Iphonetricks.org, "Apple Watch Activity App Setup & Usage Tips", Online Available at: https://www.iphonetricks.org/apple-watch-activity-app-setup-usage-tips/, May 4, 2015, 4 pages.
Non-Final Office Action received for U.S. Appl No. 15/372,133, mailed on Jul. 24, 2018, 13 pages.
Non-Final Office Action received for U.S. Appl No. 15/372,133, mailed on Oct. 3, 2019, 14 pages.
Non-Final Office Action received for U.S. Appl No. 15/372,133, mailed on Sep. 14, 2020, 17 pages.
Non-Final Office Action received for U.S. Appl No. 17/345,092, mailed on Jan. 25, 2023, 36 pages.
Non-Final Office Action received for U.S. Appl No. 17/550,806, mailed on Nov. 28, 2022, 21 pages.
Notice of Acceptance received for Australian Patent Application No. 2017277848, mailed on Apr. 20, 2020, 3 pages.
Notice of Acceptance received for Australian Patent Application No. 2020203453, mailed on Feb. 10, 2021, 3 pages.
Notice of Acceptance received for Australian Patent Application No. 2021203301, mailed on Feb. 23, 2022, 3 pages.
Notice of Allowance received for Chinese Patent Application No. 201710400594.9, mailed on Jul. 30, 2020, 2 pages (1 page of English Translation and 1 page of Official Copy).
Notice of Allowance received for Chinese Patent Application No. 202011096049.3, mailed on Mar. 20, 2024, 2 pages (1 page of English Translation and 1 page of Official Copy).
Notice of Allowance received for Chinese Patent Application No. 202011098154.0, mailed on May 22, 2024, 5 pages (1 page of English Translation and 4 pages of Official Copy).
Notice of Allowance received for Japanese Patent Application No. 2018-563158, mailed on Nov. 8, 2019, 4 pages (1 page of English Translation and 3 page of Official Copy).
Notice of Allowance received for Japanese Patent Application No. 2019-222213, mailed on Aug. 30, 2021, 4 pages (1 page of English Translation and 3 page of Official Copy).
Notice of Allowance received for Japanese Patent Application No. 2021-159616, mailed on Apr. 12, 2024, 4 pages (1 page of English Translation and 3 page of Official Copy).
Notice of Allowance received for Korean Patent Application No. 10-2018-7034689, mailed on Mar. 27, 2020, 6 pages (2 page of English Translation and 4 page of Official Copy).
Notice of Allowance received for Korean Patent Application No. 10-2020-7016741, mailed on Feb. 24, 2021, 5 pages (2 pages of English Translation and 3 pages of Official Copy).
Notice of Allowance received for Korean Patent Application No. 10-2021-7015702, mailed on Dec. 27, 2021, 3 pages (Official Copy Only) {See Communication Under Rule 37 CFR § 1.98(a) (3)}.
Notice of Allowance received for Korean Patent Application No. 10-2022-7010343, mailed on Feb. 27, 2023, 6 pages (2 pages of English Translation and 4 pages of Official Copy).
Notice of Allowance received for Korean Patent Application No. 10-2023-7018493, mailed on Jul. 18, 2023, 7 pages (2 pages of English Translation and 5 pages of Official Copy).
Notice of Allowance received for U.S. Appl. No. 15/372,133, mailed on Feb. 11, 2021, 8 pages.
Notice of Allowance received for U.S. Appl. No. 15/372,133, mailed on Feb. 26, 2021, 3 pages.
Notice of Allowance received for U.S. Appl. No. 17/345,092, mailed on Apr. 10, 2023, 9 pages.
Notice of Allowance received for U.S. Appl. No. 17/550,806, mailed on Jun. 17, 2024, 39 pages.
Office Action received for Australian Patent Application No. 2017277848, mailed on Aug. 28, 2019, 4 pages.
Office Action received for Australian Patent Application No. 2017277848, mailed on Jan. 16, 2020, 4 pages.
Office Action received for Australian Patent Application No. 2017277848, mailed on Jun. 13, 2019, 4 pages.
Office Action received for Australian Patent Application No. 2017277848, mailed on Mar. 4, 2020, 3 pages.
Office Action received for Australian Patent Application No. 2017277848, mailed on Nov. 1, 2019, 4 pages.
Office Action received for Australian Patent Application No. 2020203453, mailed on Aug. 12, 2020, 4 pages.
Office Action received for Australian Patent Application No. 2020203453, mailed on Dec. 18, 2020, 4 pages.
Office Action received for Australian Patent Application No. 2020203453, mailed on Oct. 29, 2020, 4 pages.
Office Action received for Australian Patent Application No. 2021203301, mailed on Jan. 18, 2022, 3 pages.
Office Action received for Australian Patent Application No. 2021203301, mailed on Nov. 3, 2021, 3 pages.
Office Action received for Chinese Patent Application No. 201710400594.9, mailed on Apr. 23, 2018 3 pages (1 page of English Translation and 2 pages of Official Copy).
Office Action received for Chinese Patent Application No. 201710400594.9, mailed on Jul. 17, 2017 2 pages (1 page of English Translation and 1 pages of Official Copy).
Office Action received for Chinese Patent Application No. 201710400594.9, mailed on Mar. 20, 2020, 6 pages (3 pages of English Translation and 3 pages of Official Copy).
Office Action received for Chinese Patent Application No. 201710400594.9, mailed on May 14, 2019, 14 pages (5 pages of English Translation and 9 pages of Official Copy).
Office Action received for Chinese Patent Application No. 201710400594.9, mailed on Nov. 15, 2019, 12 pages (5 pages of English Translation and 7 pages of Official Copy).
Office Action received for Chinese Patent Application No. 202011096049.3, mailed on Jan. 9, 2024, 8 pages (4 pages of English Translation and 4 pages of Official Copy).
Office Action received for Chinese Patent Application No. 202011096049.3, mailed on Nov. 3, 2023, 27 pages (12 pages of English Translation and 15 pages of Official Copy).
Office Action received for Chinese Patent Application No. 202011098154.0, mailed on Dec. 26, 2023, 22 pages (11 pages of English Translation and 11 pages of Official Copy).
Office Action received for Danish Patent Application No. PA201770384, mailed on Oct. 27, 2017, 7 pages.
Office Action received for European Patent Application No. 17810736.3, mailed on Nov. 11, 2020, 6 pages.
Office Action received for European Patent Application No. 22731014.1, mailed on Dec. 12, 2024, 8 pages.
Office Action received for Japanese Patent Application No. 2019-222213, mailed on Jan. 4, 2021, 9 pages (5 pages of English Translation and 4 pages of Official Copy).
Office Action received for Japanese Patent Application No. 2021-159616, mailed on Dec. 5, 2022, 11 pages (6 pages of English Translation and 5 pages of Official Copy).
Office Action received for Japanese Patent Application No. 2021-159616, mailed on Dec. 8, 2023, 4 pages (2 pages of English Translation and 2 pages of Official Copy).
Office Action received for Japanese Patent Application No. 2021-159616, mailed on Jun. 9, 2023, 4 pages (2 pages of English Translation and 2 pages of Official Copy).
Office Action received for Korean Patent Application No. 10-2018-7034689, mailed on Nov. 28, 2019, 11 pages (5 pages of English Translation and 6 pages of Official Copy).
Office Action received for Korean Patent Application No. 10-2020-7016741, mailed on Jul. 22, 2020, 10 pages (4 pages of English Translation and 6 pages of Official Copy).
Office Action received for Korean Patent Application No. 10-2021-7015702, mailed on Jun. 19, 2021, 12 pages (6 pages of English Translation and 6 pages of Official Copy).
Office Action received for Korean Patent Application No. 10-2022-7010343, mailed on May 19, 2022, 12 pages (6 pages of English Translation and 6 pages of Official Copy).
Office Action received for Korean Patent Application No. 10-2022-7010343, mailed on Nov. 17, 2022, 6 pages (3 pages of English Translation and 3 pages of Official Copy).

(56) References Cited

OTHER PUBLICATIONS

Paced Breathing, "How to use Paced Breathing", Retrieved from https://pacedbreathing.blogspot.com/2014/03/how-to-use-paced-breathing .html on Sep. 9, 2020, Apr. 3, 2015, 7 pages.
Stachowiak, Sandy, "Relax, breathe deep and regain focus with Hear and Now", Available online at: https://appadvice.com/appnn/2016/01/relax-breathe-deep-and-regain-focus-with-hear-and-now, Jan. 6, 2016, 3 pages.
Supplemental Notice of Allowance received for U.S. Appl. No. 15/372,133, mailed on Mar. 26, 2021, 3 pages.
Supplemental Notice of Allowance received for U.S. Appl. No. 17/550,806, mailed on Jun. 28, 2024, 2 pages.
Tiles and Toasts, "Toast Notification and Action Center Overview for Windows 10", Online Available at: https://blogs.msdn.microsoft.com/tiles_and_toasts/2015/07/08/toast-notification-and-action-center-overview-for-windows-10/, Jul. 8, 2015, 9 pages.
Time Out App, "Release Notes". Online Available at: www.dejal.com/timeout/release, 2016, 8 pages.
Time Out App, "Screens Shots and user guide", Online Available at: https://web.archive.org/web/20160314023701/http://www.dejal.com/timeout/images/, Mar. 14, 2016, 10 pages.
Wesley, "Apple Watch Series 1", online available at: http://tool-box.info/blog/archives/1737-unknown.html, May 28, 2015, 5 pages (Official Copy Only) {See Communication Under Rule 37 CFR § 1.98(a) (3)}.
Wikipedia, "Nike+iPod", Online available at: http://en.wikipedia.org/w/index.php?title=Nike%2BiPod&oldid=420671395, Mar. 25, 2011, pp. 1-4.
Windowsunited, "Breathe Deeply Now! Please Take a Deep Breath and Relax", Online Available at: https://windowsunited.de/breathe-deeply-now-die-app-gegen-angszustaende/, Oct. 4, 2014, 8 pages.
Zou et al., "Prophet: What App You Wish to Use Next", Ubicomp '13, Online available at: DOI: 10.1145/2494091.2494146, Sep. 8-12, 2013, pp. 167-170.

* cited by examiner 11.1.1-100  11.1.1-108a  11.1.1-110a  11.1.1-106a  11.1.1-108b  11.1.1-106b  11.1.1-110b  11.1.1-114  11.1.1-102  11.1.1-112  11.1.1-104a  11.1.1-104b 11.1.2-104  11.1.2-100  11.1.2-102  11.1.2-106a  11.1.2-110d  11.1.2-109  11.1.2-106b  11.1.2-116  11.1.2-108  11.1.2-111  11.1.2-114  11.1.2-118  11.1.2-110a  11.1.2-110c  11.1.2-112  11.1.2-110b  11.1.2-110e  11.1.2-110f Display Generation Component 120

Memory 320

Operating System 330

XR Experience Module 340

Data Obtaining Unit 342

XR Presenting Unit 344

XR Map Generating Unit 346

Data Transmitting Unit 348

XR Display(s) 312

Image Sensor(s) 314

Comm. Interface(s) 308

Programming Interface(s) 310

Processing Unit(s) 302

I/O Devices & Sensors 306

304

800 ⟍

---

802
Detect, via the one or more input devices, breath information for a user of the computer system.

---

804
Display, via the one or more display generation components, a plurality of particles that move based on the detected breath information, including:

806
Changing, over time, a lighting characteristic of a first particle of the plurality of particles based on a magnitude of movement of the first particle.

808
Changing, over time, a lighting characteristic of a second particle of the one or more particles, different from the first particle, based on a magnitude of movement of the second particle.

---

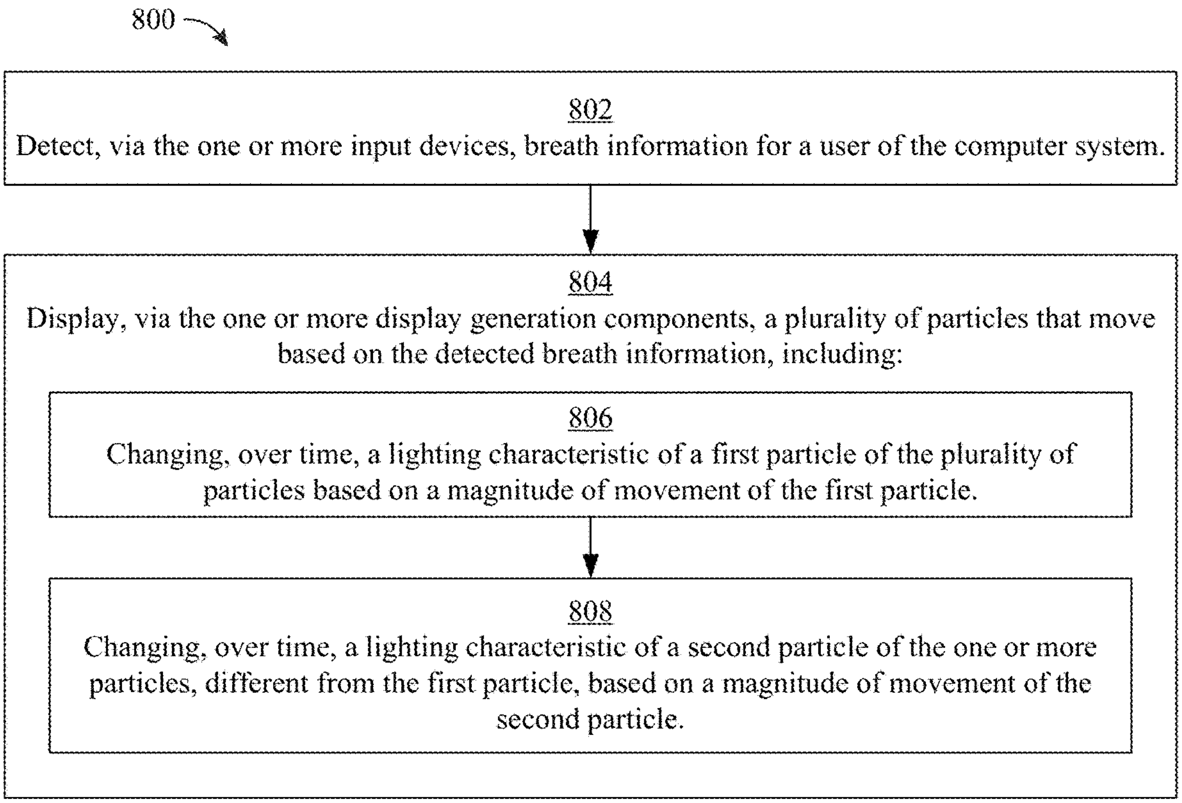

902
Display, via the one or more display generation components, a plurality of particles.

904
Detect, via the one or more input devices, breath information for a plurality of breaths for a user of the computer system.

906
Subsequent to detecting breath information for the plurality of breaths and while displaying the plurality of particles, detect breath information for at least a portion of a current breath.

908
In response to detecting breath information for at least the portion of the current breath:

910
In accordance with a determination that a condition is met, move the plurality of particles based on the breath information for the current breath.

912
In accordance with a determination that the condition is not met, move the plurality of particles based on the breath information for the plurality of breaths and not based on the breath information for the current breath.

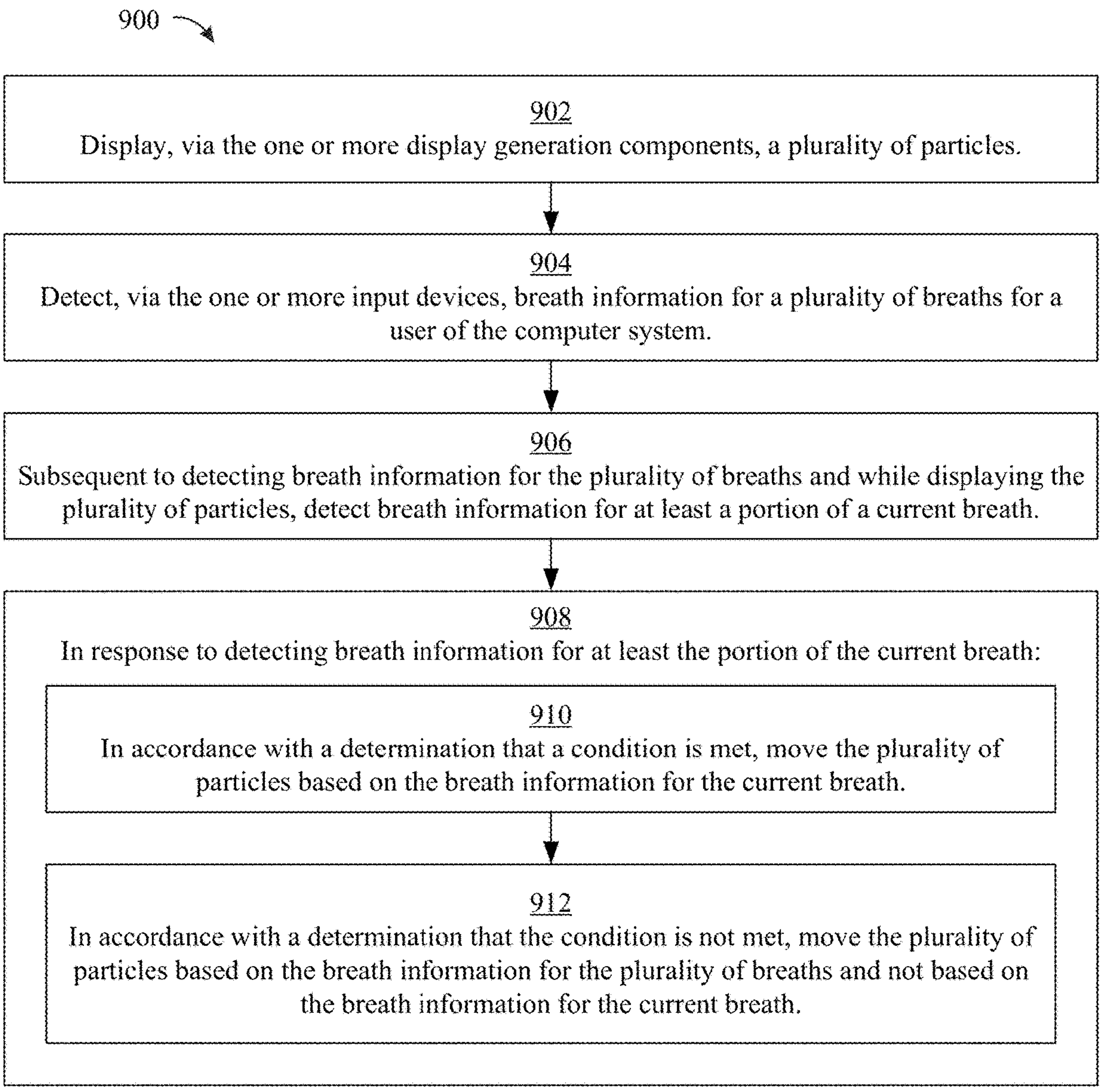

*FIG. 9*

USER INTERFACES FOR BREATH TRACKING

CROSS-REFERENCE TO RELATED APPLICATIONS

This application claims priority to U.S. Provisional Patent Application Ser. No. 63/657,919, entitled "USER INTERFACES FOR BREATH TRACKING," filed on Jun. 9, 2024. The content of this application is hereby incorporated by reference in its entirety and for all purposes.

TECHNICAL FIELD

The present disclosure relates generally to computer systems that are in communication with one or more display generation components and one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touchscreen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include breath tracking are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for breath tracking more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has (e.g., includes or is in communication with) a display generation component (e.g., a display device such as a head-mounted display (HMD), a display, a projector, a touch-sensitive display (also known as a "touch screen" or "touch-screen display"), or other device or component that presents visual content to a user, for example on or in the display generation component itself or produced from the display generation component and visible elsewhere). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is described. The method comprises: at a computer system that is in communication with one or more display generation components and one or more input devices: detecting, via the one or more input devices, breath information for a user of the computer system; and displaying, via the one or more display generation components, a plurality of particles that move based on the detected breath information, including: changing, over time, a lighting characteristic of a first particle of the plurality of particles based on a magnitude of movement of the first particle; and changing, over time, a lighting characteristic of a second particle of the one or more particles, different from the first particle, based on a magnitude of movement of the second particle.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: detecting, via the one or more input devices, breath information for a user of the computer system; and displaying, via the one or more display generation components, a plurality of particles that move based on the detected breath information, including: changing, over time, a lighting characteristic of a first particle of the plurality of particles based on a magnitude of movement of the first particle; and changing, over time, a lighting characteristic of a second particle of the one or more particles, different from the first particle, based on a magnitude of movement of the second particle.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: detecting, via the one or more input devices, breath information for a user of the computer system; and displaying, via the one or more display generation components, a plurality of particles that move based on the detected breath information, including: changing, over time, a lighting characteristic of a first particle of the plurality of particles based on a magnitude of movement of the first particle; and changing, over time, a lighting characteristic of a second particle of the one or more particles, different from the first particle, based on a magnitude of movement of the second particle.

In accordance with some embodiments, a computer system that is configured to communicate with one or more display generation components and one or more input devices is described. The computer system comprises: one or more processors; and memory storing one or more programs configured to be executed by the one or more processors, the one or more programs including instructions for: detecting, via the one or more input devices, breath information for a user of the computer system; and displaying, via the one or more display generation components, a plurality of particles that move based on the detected breath information, including: changing, over time, a lighting characteristic of a first particle of the plurality of particles based on a magnitude of movement of the first particle; and changing, over time, a lighting characteristic of a second particle of the one or more particles, different from the first particle, based on a magnitude of movement of the second particle.

In accordance with some embodiments, a computer system that is configured to communicate with one or more display generation components and one or more input devices is described. The computer system comprises: means for detecting, via the one or more input devices, breath information for a user of the computer system; and means for displaying, via the one or more display generation components, a plurality of particles that move based on the detected breath information, including: changing, over time, a lighting characteristic of a first particle of the plurality of particles based on a magnitude of movement of the first particle; and changing, over time, a lighting characteristic of a second particle of the one or more particles, different from the first particle, based on a magnitude of movement of the second particle.

In accordance with some embodiments, a computer program product is described. The computer program product comprises one or more programs configured to be executed by one or more processors of a computer system that is in communication with one or more input devices and one or more display generation components, the one or more programs including instructions for: detecting, via the one or more input devices, breath information for a user of the computer system; and displaying, via the one or more display generation components, a plurality of particles that move based on the detected breath information, including: changing, over time, a lighting characteristic of a first particle of the plurality of particles based on a magnitude of movement of the first particle; and changing, over time, a lighting characteristic of a second particle of the one or more particles, different from the first particle, based on a magnitude of movement of the second particle.

In accordance with some embodiments, a method is described. The method comprises: at a computer system that is in communication with one or more input devices and one or more display generation components: displaying, via the one or more display generation components, a plurality of particles; detecting, via the one or more input devices, breath information for a plurality of breaths for a user of the computer system; subsequent to detecting breath information for the plurality of breaths and while displaying the plurality of particles, detecting breath information for at least a portion of a current breath; and in response to detecting breath information for at least the portion of the current breath: in accordance with a determination that a condition is met, moving the plurality of particles based on the breath information for the current breath; and in accordance with a determination that the condition is not met, moving the plurality of particles based on the breath information for the plurality of breaths and not based on the breath information for the current breath.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components, a plurality of particles; detecting, via the one or more input devices, breath information for a plurality of breaths for a user of the computer system; subsequent to detecting breath information for the plurality of breaths and while displaying the plurality of particles, detecting breath information for at least a portion of a current breath; and in response to detecting breath information for at least the portion of the current breath: in accordance with a determination that a condition is met, moving the plurality of particles based on the breath information for the current breath; and in accordance with a determination that the condition is not met, moving the plurality of particles based on the breath information for the plurality of breaths and not based on the breath information for the current breath.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components, a plurality of particles; detecting, via the one or more input devices, breath information for a plurality of breaths for a user of the computer system; subsequent to detecting breath information for the plurality of breaths and while displaying the plurality of particles, detecting breath information for at least a portion of a current breath; and in response to detecting breath information for at least the portion of the current breath: in accordance with a determination that a condition is met, moving the plurality of particles based on the breath information for the current breath; and in accordance with a determination that the condition is not met, moving the plurality of particles based on the breath information for the plurality of breaths and not based on the breath information for the current breath.

In accordance with some embodiments, a computer system that is configured to communicate with one or more display generation components and one or more input devices is described. The computer system comprises: one or more processors; and memory storing one or more programs configured to be executed by the one or more processors, the one or more programs including instructions for: displaying, via the one or more display generation components, a plurality of particles; detecting, via the one or more input devices, breath information for a plurality of breaths for a user of the computer system; subsequent to detecting breath information for the plurality of breaths and while displaying the plurality of particles, detecting breath information for at least a portion of a current breath; and in response to detecting breath information for at least the portion of the current breath: in accordance with a determination that a condition is met, moving the plurality of particles based on the breath information for the current breath; and in accordance with a determination that the condition is not met, moving the plurality of particles based on the breath information for the plurality of breaths and not based on the breath information for the current breath.

In accordance with some embodiments, a computer system that is configured to communicate with one or more display generation components and one or more input devices is described. The computer system comprises: means for displaying, via the one or more display generation components, a plurality of particles; means for detecting, via the one or more input devices, breath information for a plurality of breaths for a user of the computer system; means for, subsequent to detecting breath information for the plurality of breaths and while displaying the plurality of particles, detecting breath information for at least a portion of a current breath; and means for, in response to detecting breath information for at least the portion of the current breath: in accordance with a determination that a condition is met, moving the plurality of particles based on the breath information for the current breath; and in accordance with a determination that the condition is not met, moving the plurality of particles based on the breath information for the plurality of breaths and not based on the breath information for the current breath.

In accordance with some embodiments, a computer program product is described. The computer program product comprises one or more programs configured to be executed by one or more processors of a computer system that is in communication with one or more input devices and one or more display generation components, the one or more programs including instructions for: displaying, via the one or more display generation components, a plurality of particles; detecting, via the one or more input devices, breath information for a plurality of breaths for a user of the computer system; subsequent to detecting breath information for the plurality of breaths and while displaying the plurality of particles, detecting breath information for at least a portion of a current breath; and in response to detecting breath information for at least the portion of the current breath: in accordance with a determination that a condition is met, moving the plurality of particles based on the breath information for the current breath; and in accordance with a determination that the condition is not met, moving the plurality of particles based on the breath information for the plurality of breaths and not based on the breath information for the current breath.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 8 is a flow diagram of methods for providing a user interface for breath tracking that includes displaying particles with lighting characteristics that change over time, in accordance with some embodiments.

FIG. 9 is a flow diagram of methods for providing a user interface that includes displaying particles that move based on whether a condition is met, in accordance with some embodiments.

DESCRIPTION OF EMBODIMENTS

Figure 1A:
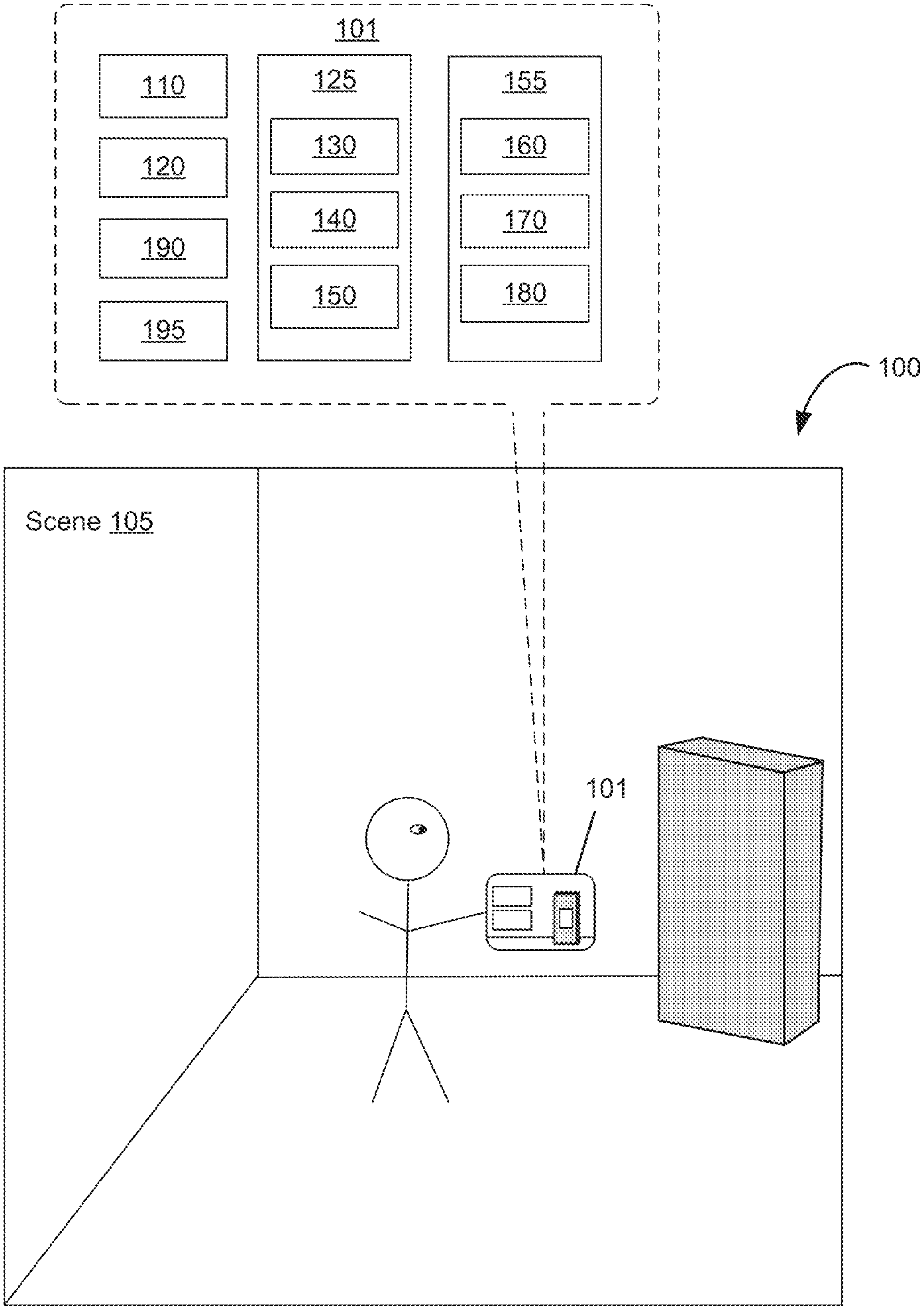
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

FIGS. 1A-6 provide a description of example computer systems for providing XR experiences to users. FIGS. 7A-7K illustrate example techniques for providing a user interface for breath tracking, in some embodiments. FIG. 8 is a flow diagram of methods of for providing a user interface for breath tracking that includes displaying particles with lighting characteristics that change over time, in some embodiments. FIG. 9 is a flow diagram of an exemplary method 900 for providing a user interface that includes displaying particles that move based on whether a condition is met, in some embodiments. The user interfaces in FIGS. 7A-7K are used to illustrate the processes in FIGS. 8 and 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted display (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space.

In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head-mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head-mounted device, a viewpoint is typically based on a location and direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head-mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head-mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, or 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos. In some embodiments, spatial audio experiences in headphones are produced by manipulating sounds in the headphone's two audio channels (e.g., left and right) so that they resemble directional sounds arriving in the ear-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each ear of the listener has a corresponding personalized filter (e.g., personalized HRTF filter), as the ears of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3A. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
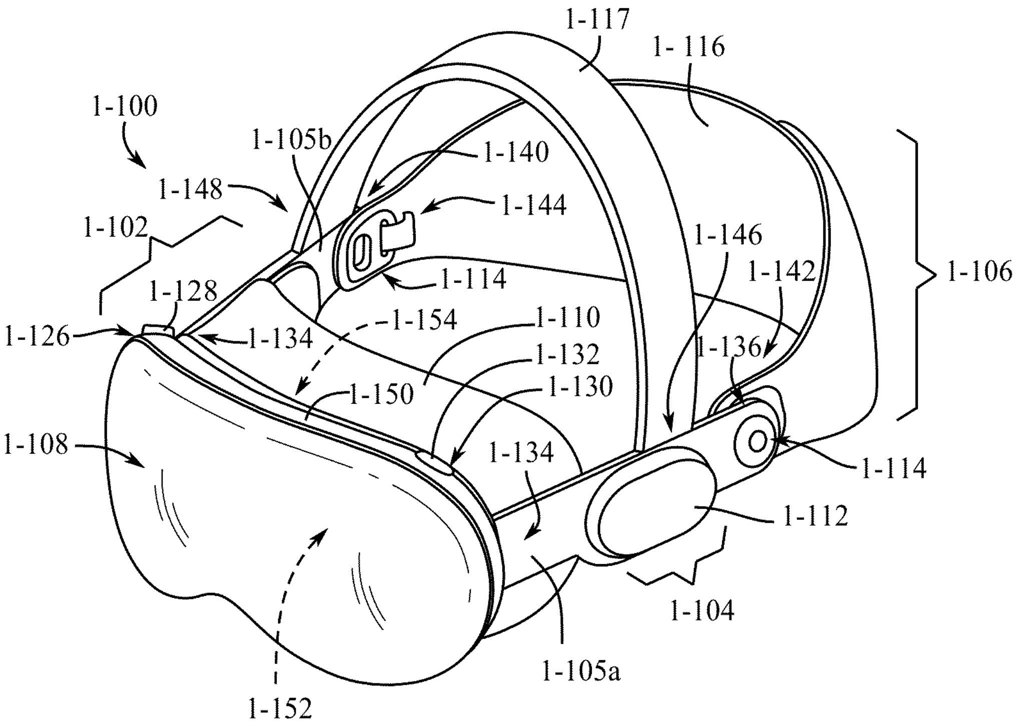
FIGS. 1B-1P are examples of a computer system for providing XR experiences in the operating environment of FIG. 1A.
Figure 1C:
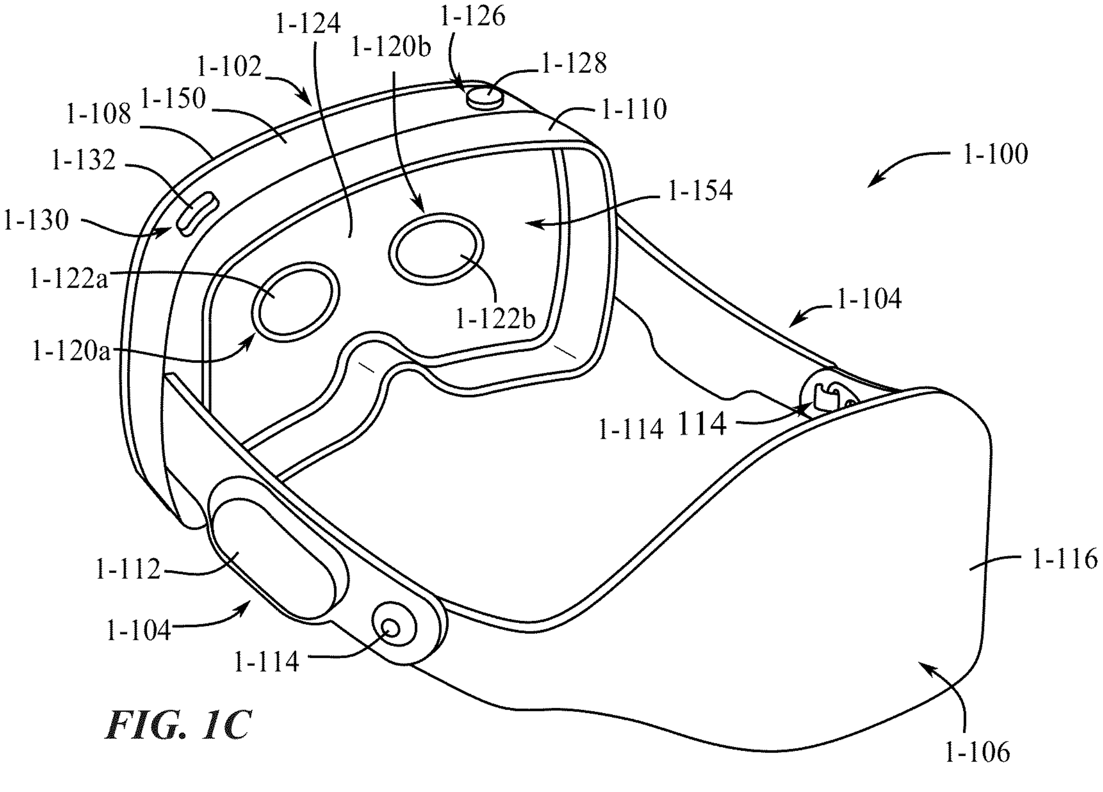
Figure 1D:
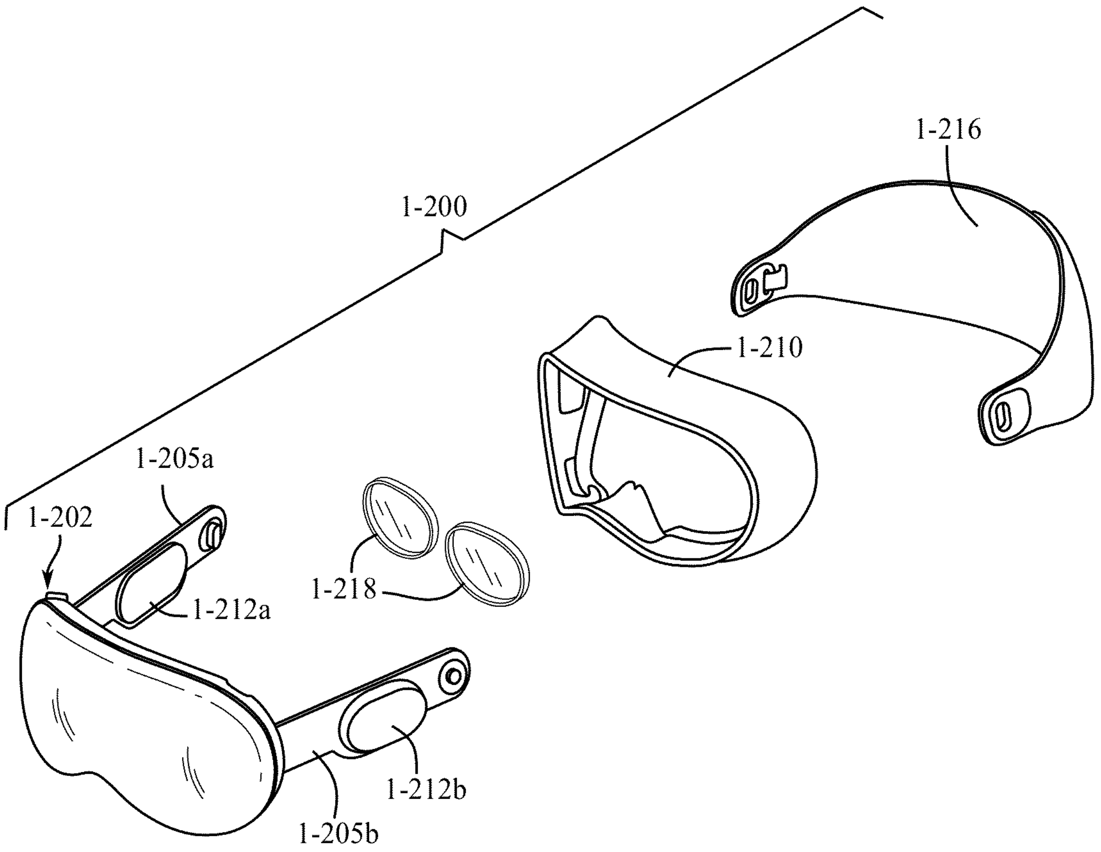
Figure 1E:
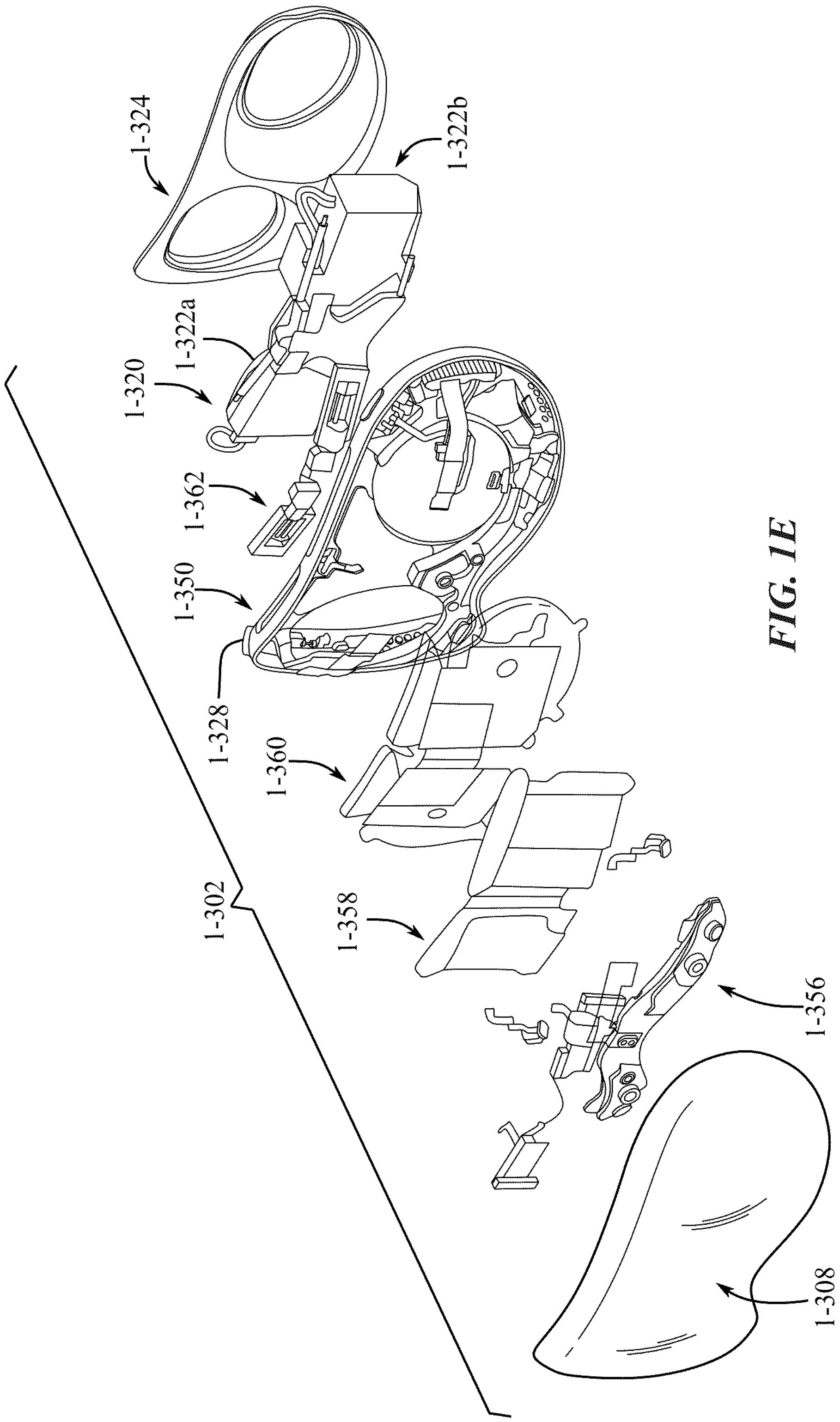
Figure 1F:
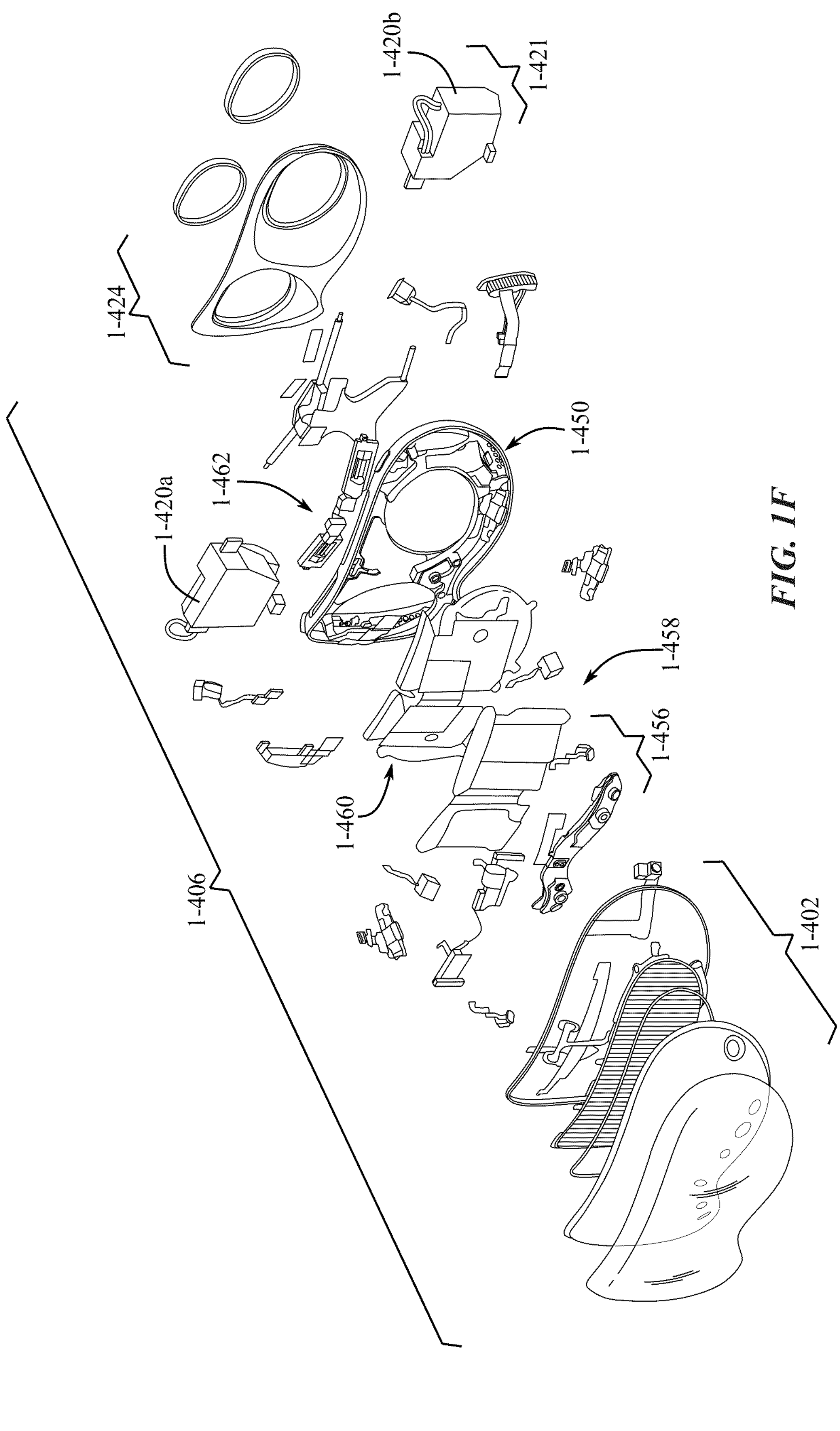
Figure 1G:
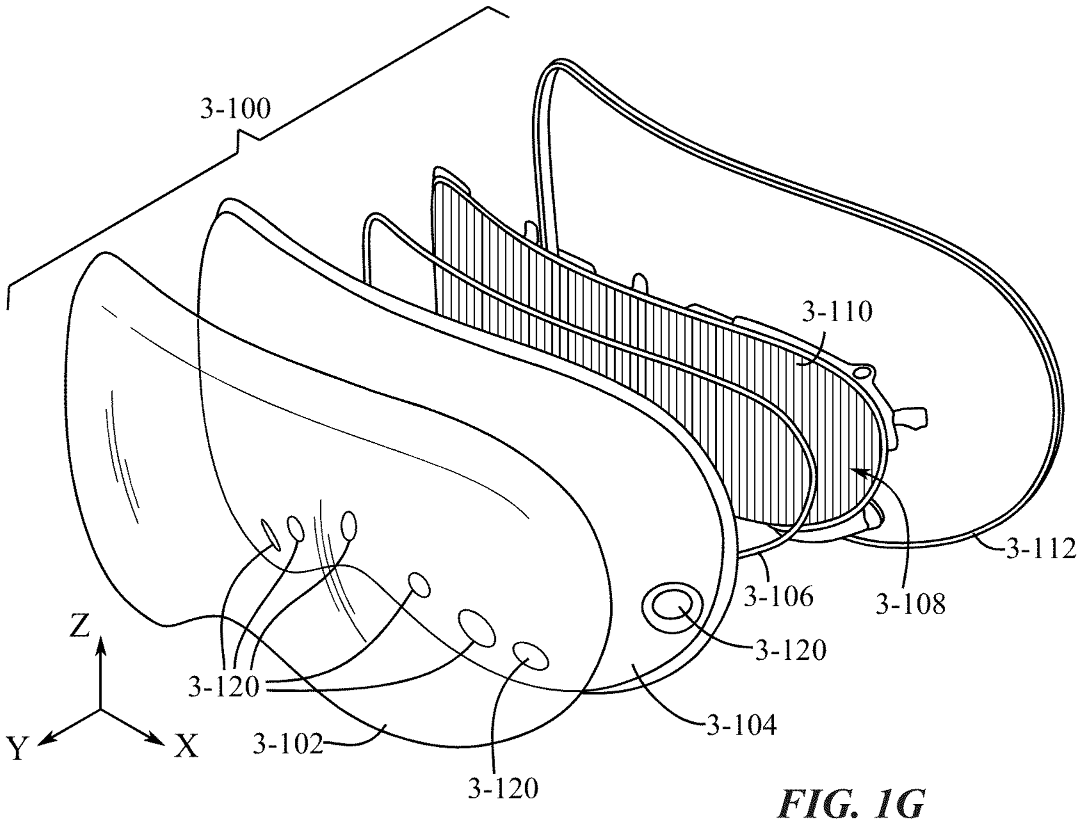
Figure 1H:
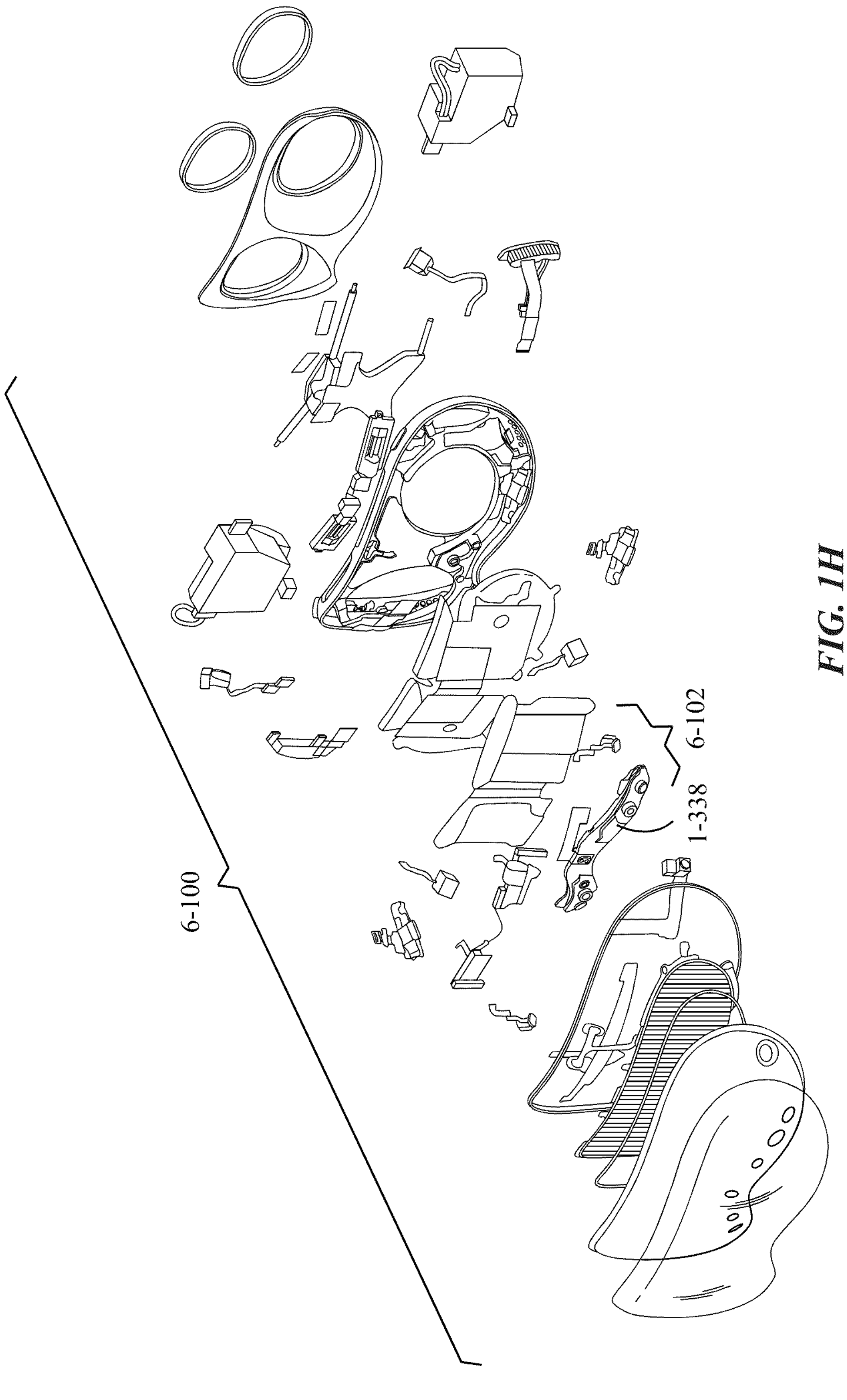
Figure 1I:
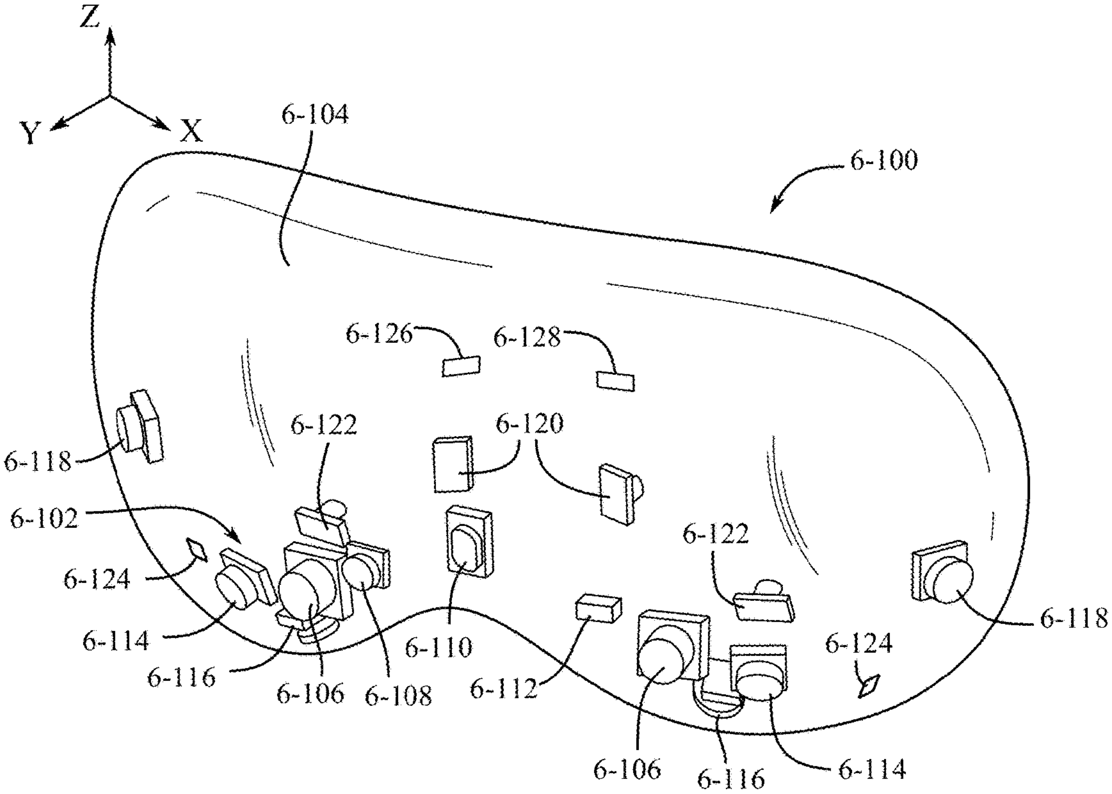
Figure 1J:
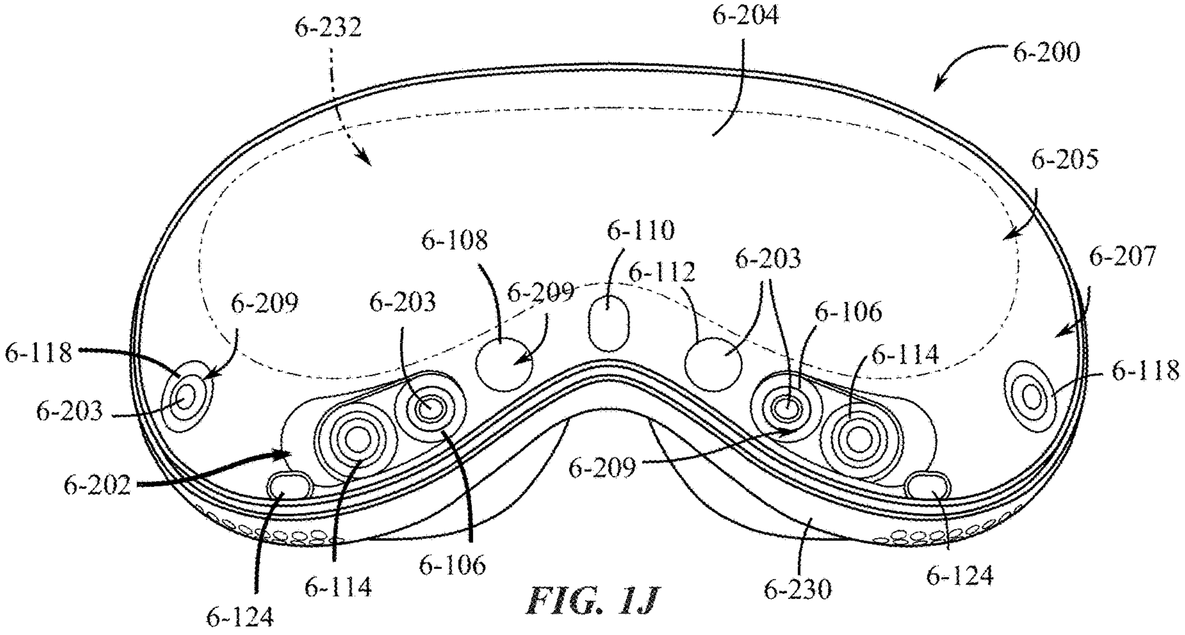
Figure 1K:
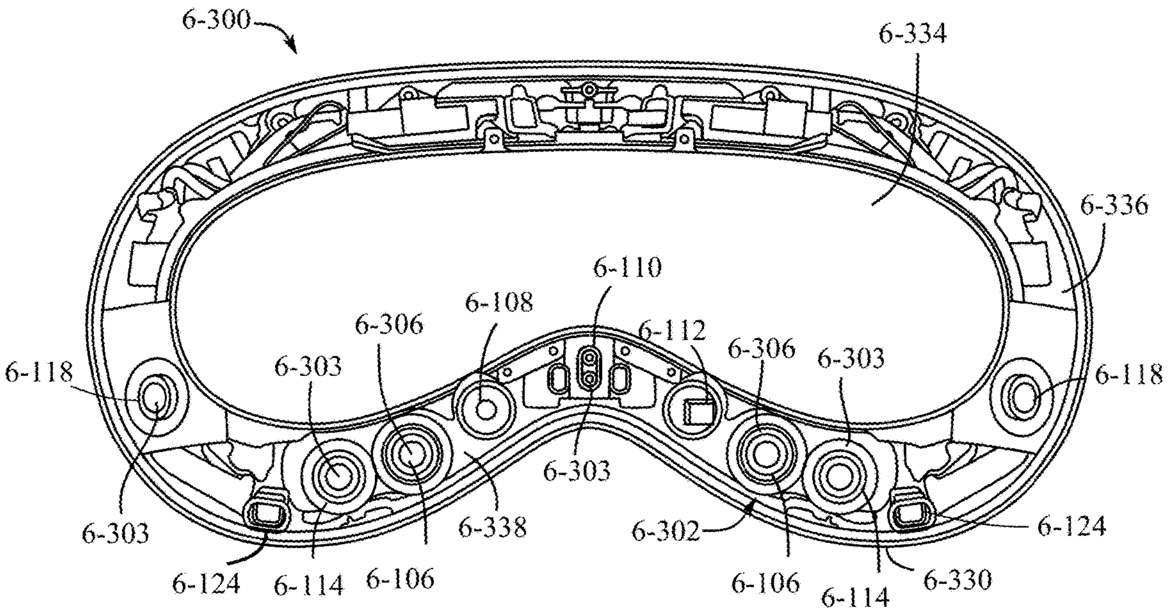
Figure 1L:
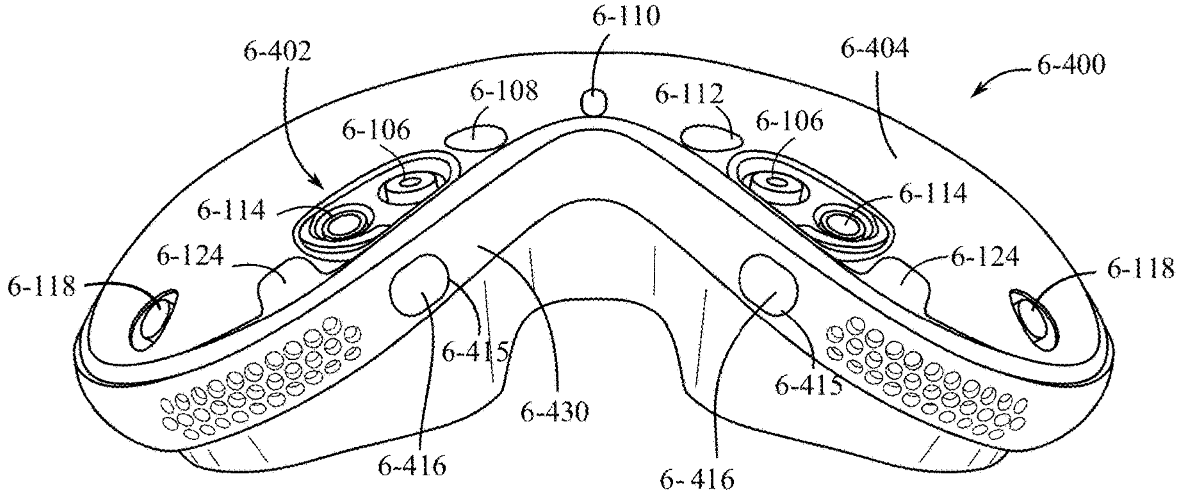
Figure 1M:
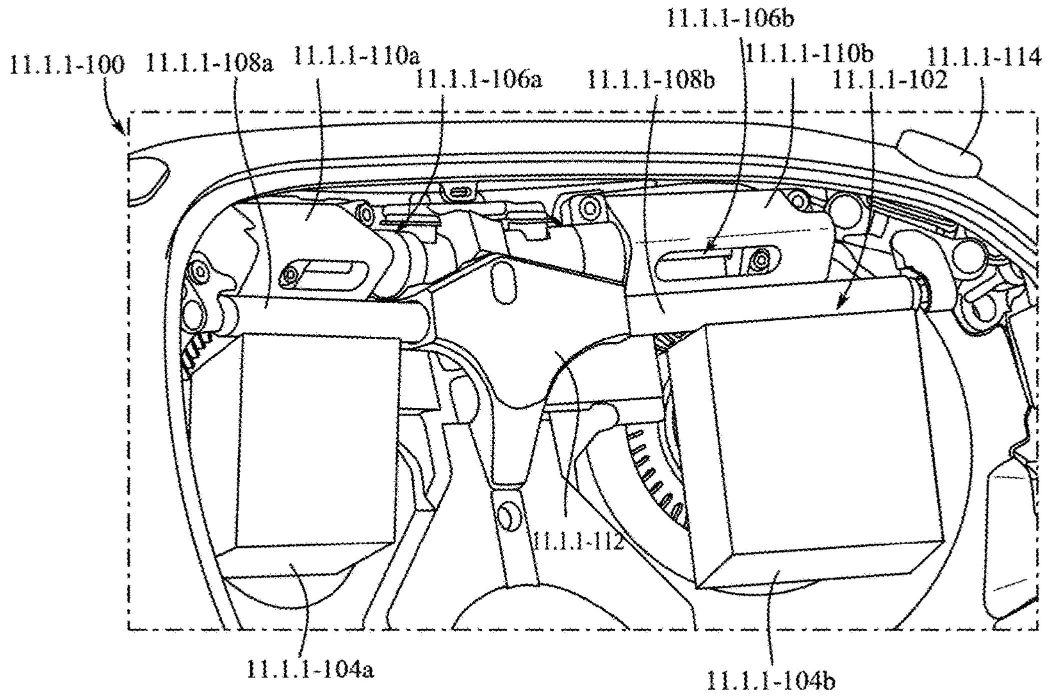
Figure 1N:
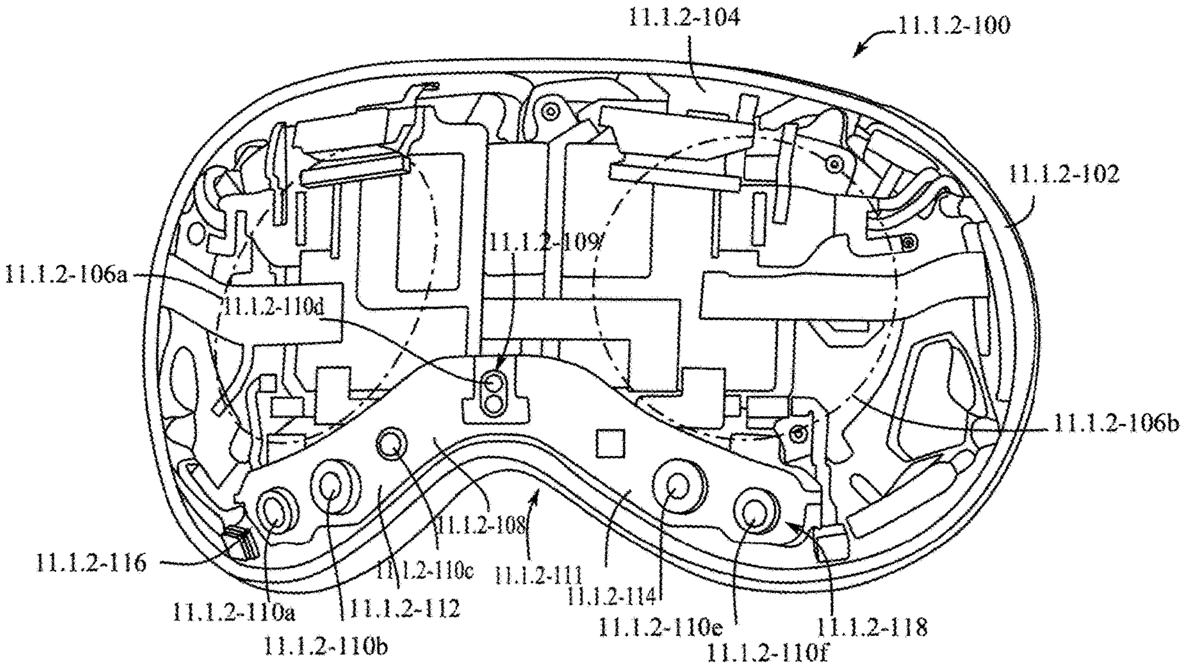
Figure 1O:
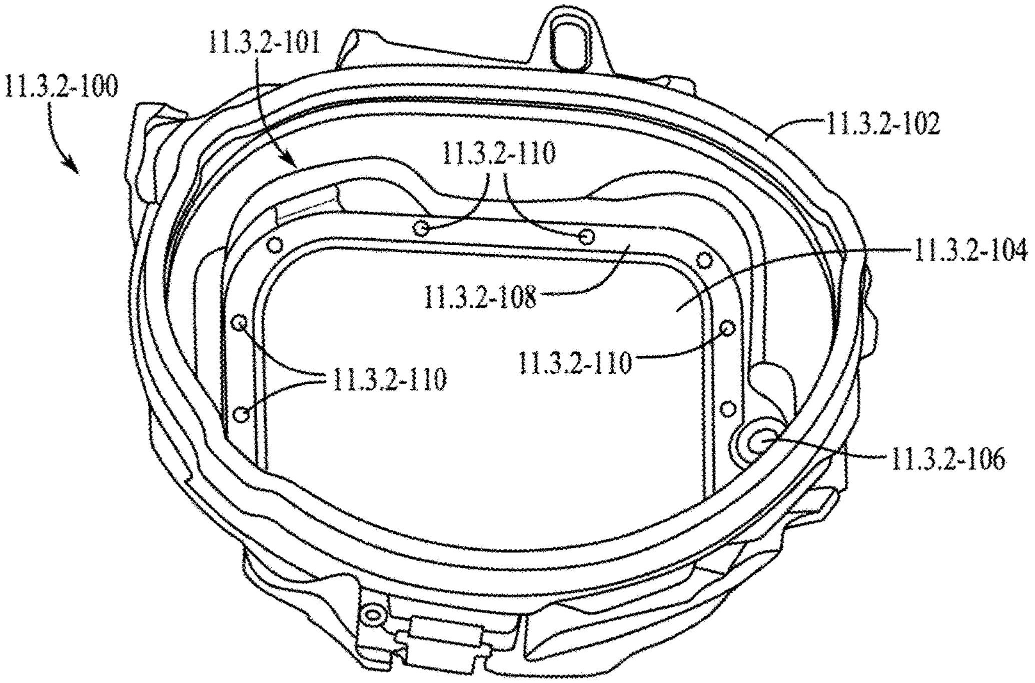
Figure 1P:
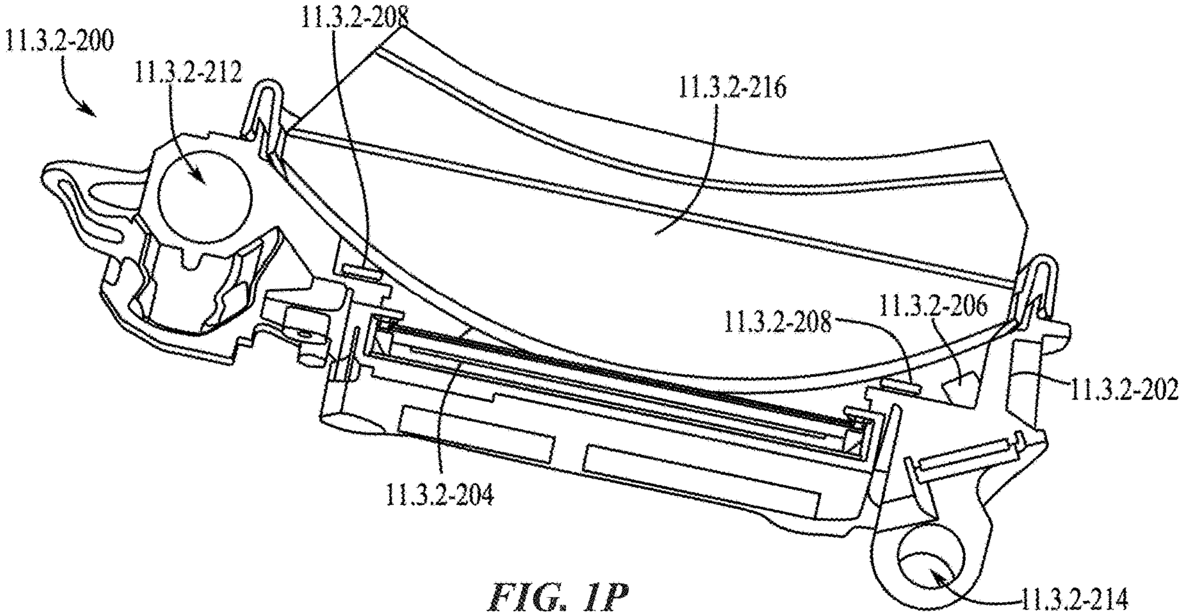

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user's head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward-facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-302 of an HMD. The display unit 1-302 can include a front display assembly 1-308, a frame/housing assembly 1-350, and a curtain assembly 1-324. The display unit 1-302 can also include a sensor assembly 1-356, logic board assembly 1-358, and cooling assembly 1-360 disposed between the frame assembly 1-350 and the front display assembly 1-308. In at least one example, the display unit 1-302 can also include a rear-facing display assembly 1-320 including first and second rear-facing display screens 1-322*a*, 1-322*b* disposed between the frame 1-350 and the curtain assembly 1-324.

In at least one example, the display unit 1-302 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-302 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of an HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the display assembly 1-108 of the HMD 1-100 shown in FIG. 1B or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100.

The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward-facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward-facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin.

In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 11-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 11-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a*-*b* slidably engaging/coupled to respective guide-rods 11.1.1-108*a*-*b* and motors 11.1.1-110*a*-*b* of left and right adjustment subsystems 11.1.1-106*a*-*b*. The IPD adjustment system 11.1.1-102 can be coupled to a bracket 11.1.1-112 and include a button 11.1.1-114 in electrical communication with the motors 11.1.1-110*a*-*b*. In at least one example, the button 11.1.1-114 can electrically communicate with the first and second motors 11.1.1-110*a*-*b* via a processor or other circuitry components to cause the first and second motors 11.1.1-110*a*-*b* to activate and cause the first and second optical modules 11.1.1-104*a*-*b*, respectively, to change position relative to one another.

In at least one example, the first and second optical modules 11.1.1-104*a*-*b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a*-*b* to match the inter-pupillary distance of the user's eyes. The optical modules 11.1.1-104*a*-*b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
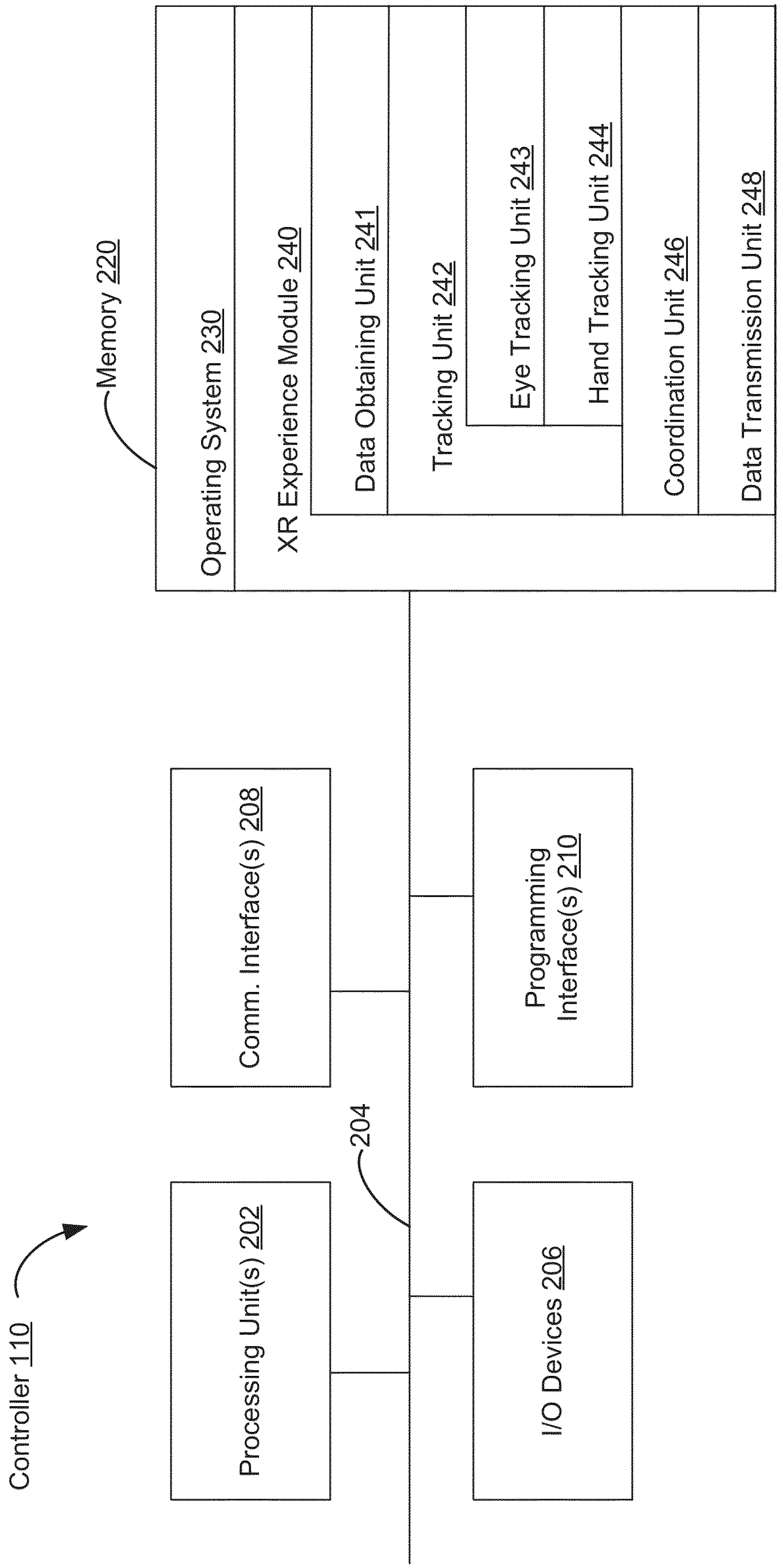
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3A:
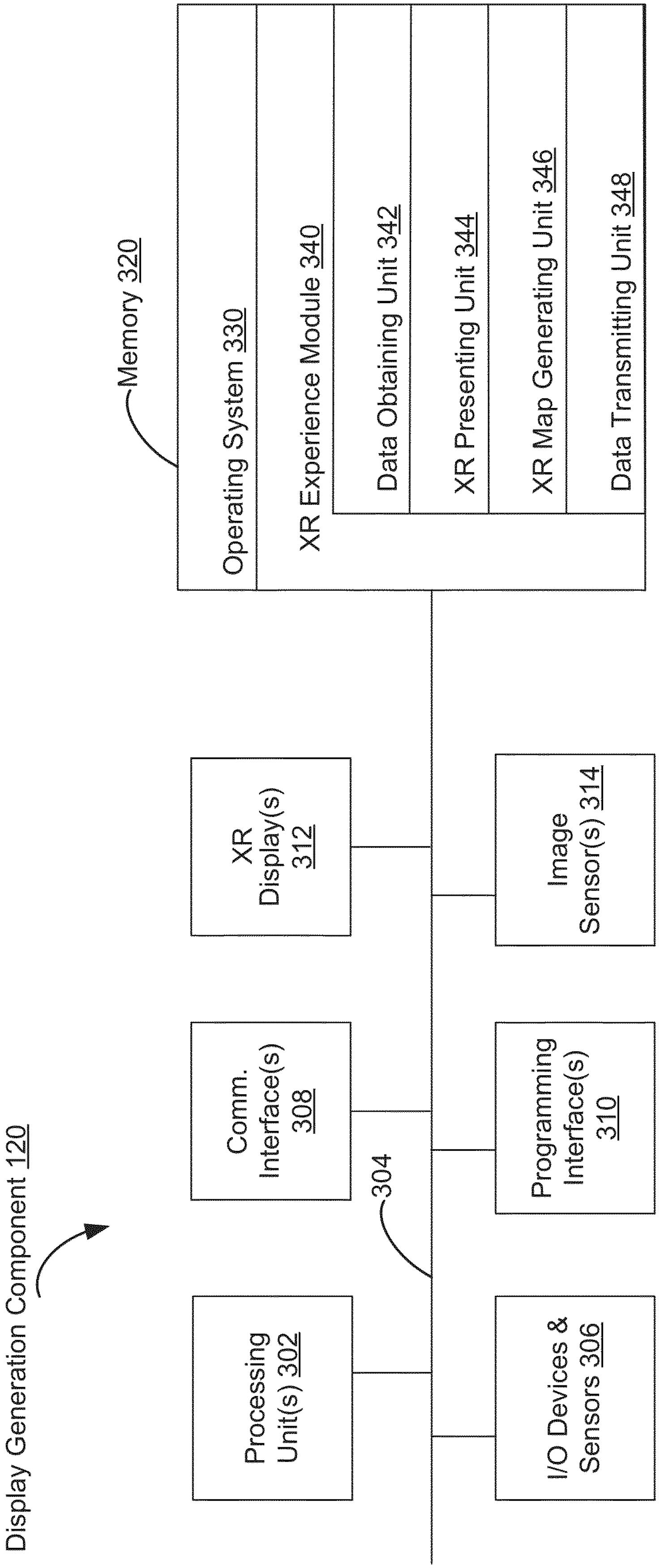
FIG. 3A is a block diagram illustrating a display generation component of a computer system that is configured to provide a visual component of the XR experience to the user in accordance with some embodiments.

FIG. 3A is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3A is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3A could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
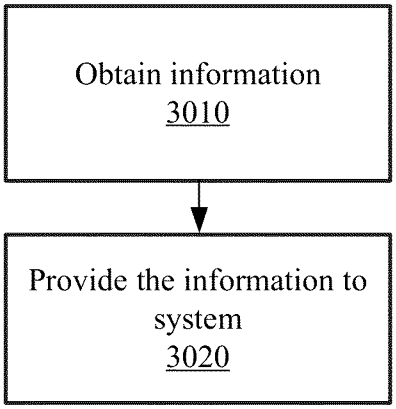
FIGS. 3B-3G illustrate the use of Application Programming Interfaces (APIs) to perform operations.
Figure 3C:
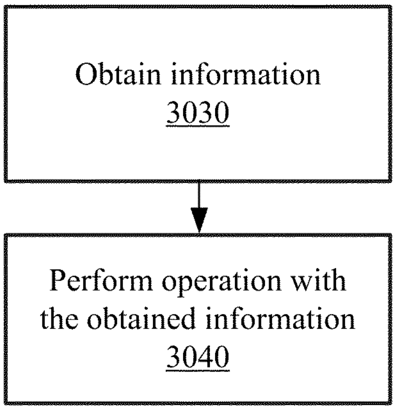

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
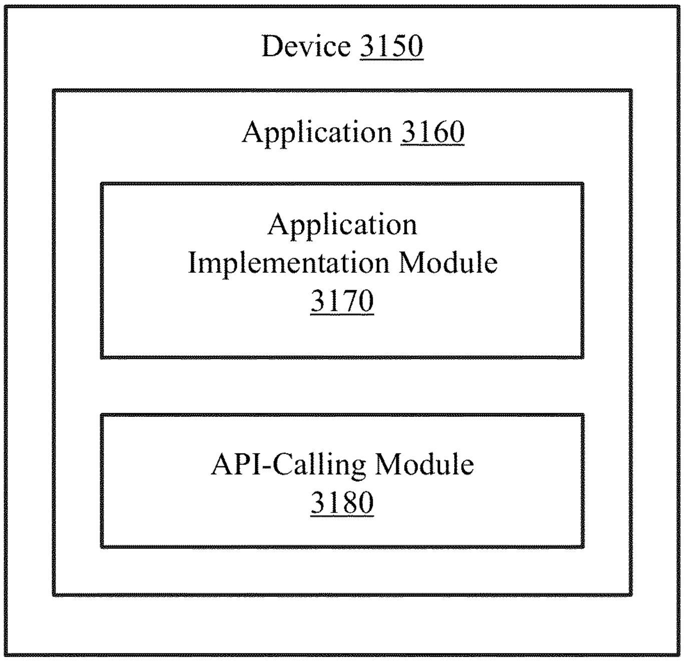
Figure 3E:
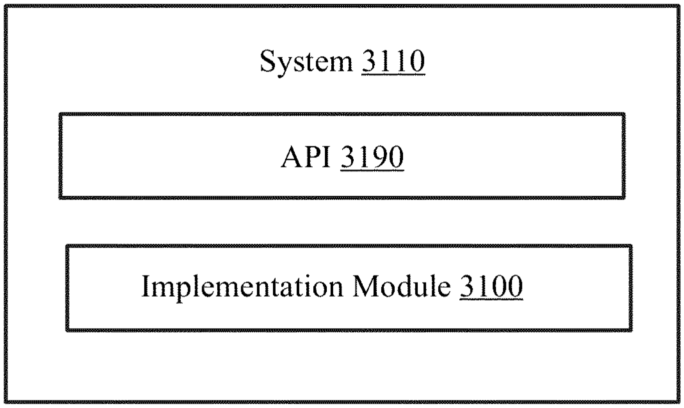
Figure 3F:
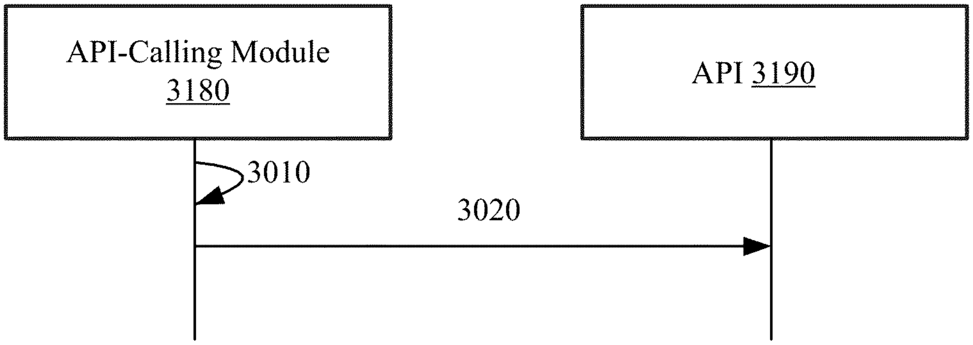

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
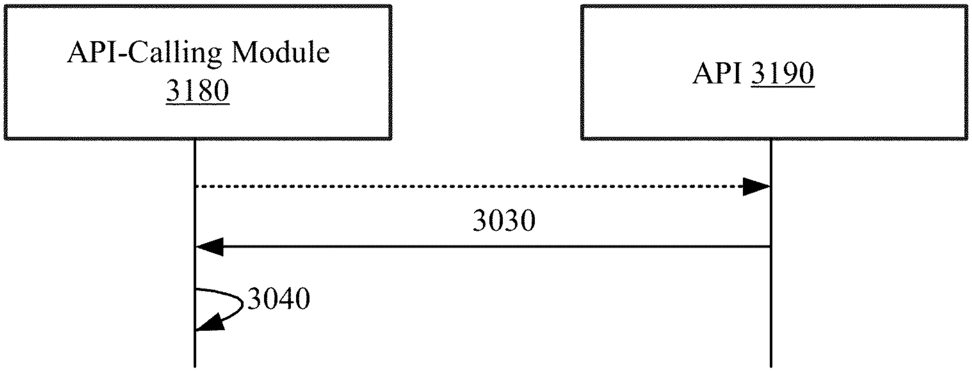

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform method 800 and/or 900 (FIGS. 8 and/or 9) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Figure 4:
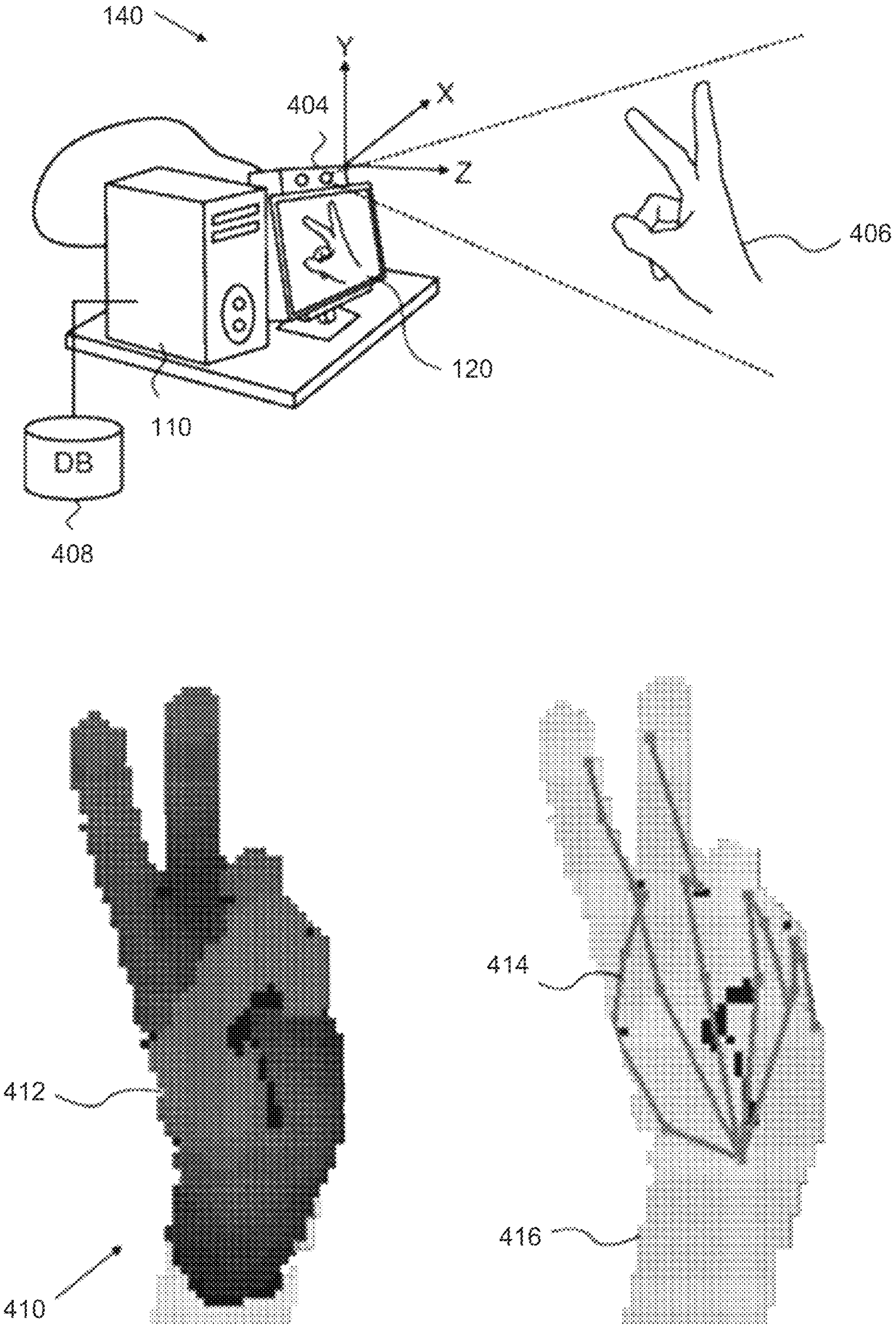
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105 or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, e.g., the measured z distance from the image sensors 404, with the shade of gray growing darker with increasing depth. The controller 110 processes these depth values in order to identify and segment a component of the image (e.g., a group of neighboring pixels) having characteristics of a human hand. These characteristics, may include, for example, overall size, shape, and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.)

and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
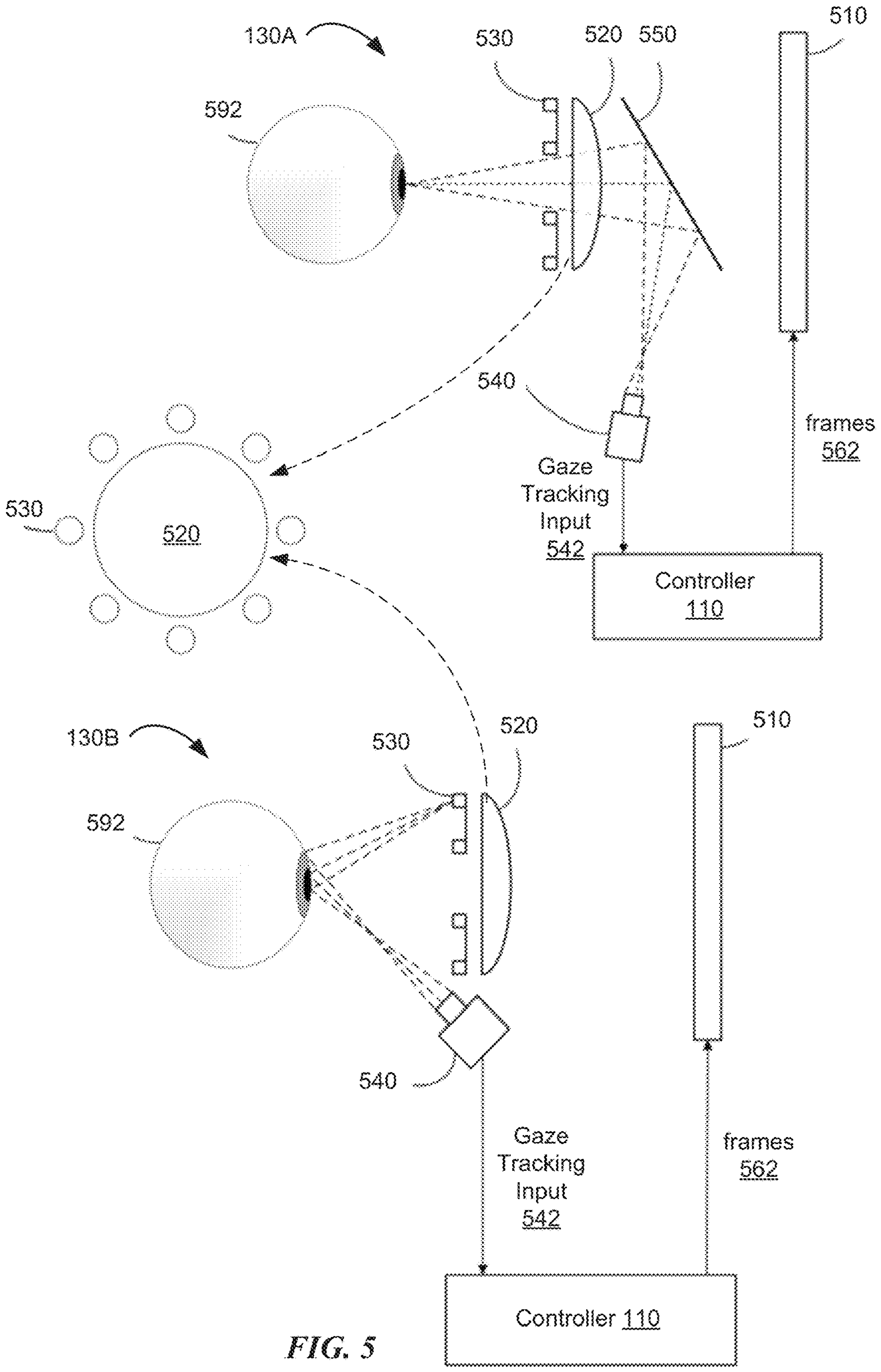
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device and is optionally used in conjunction with a head-mounted display generation component. In some embodiments, the eye tracking device 130 is not a head-mounted device and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)) mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
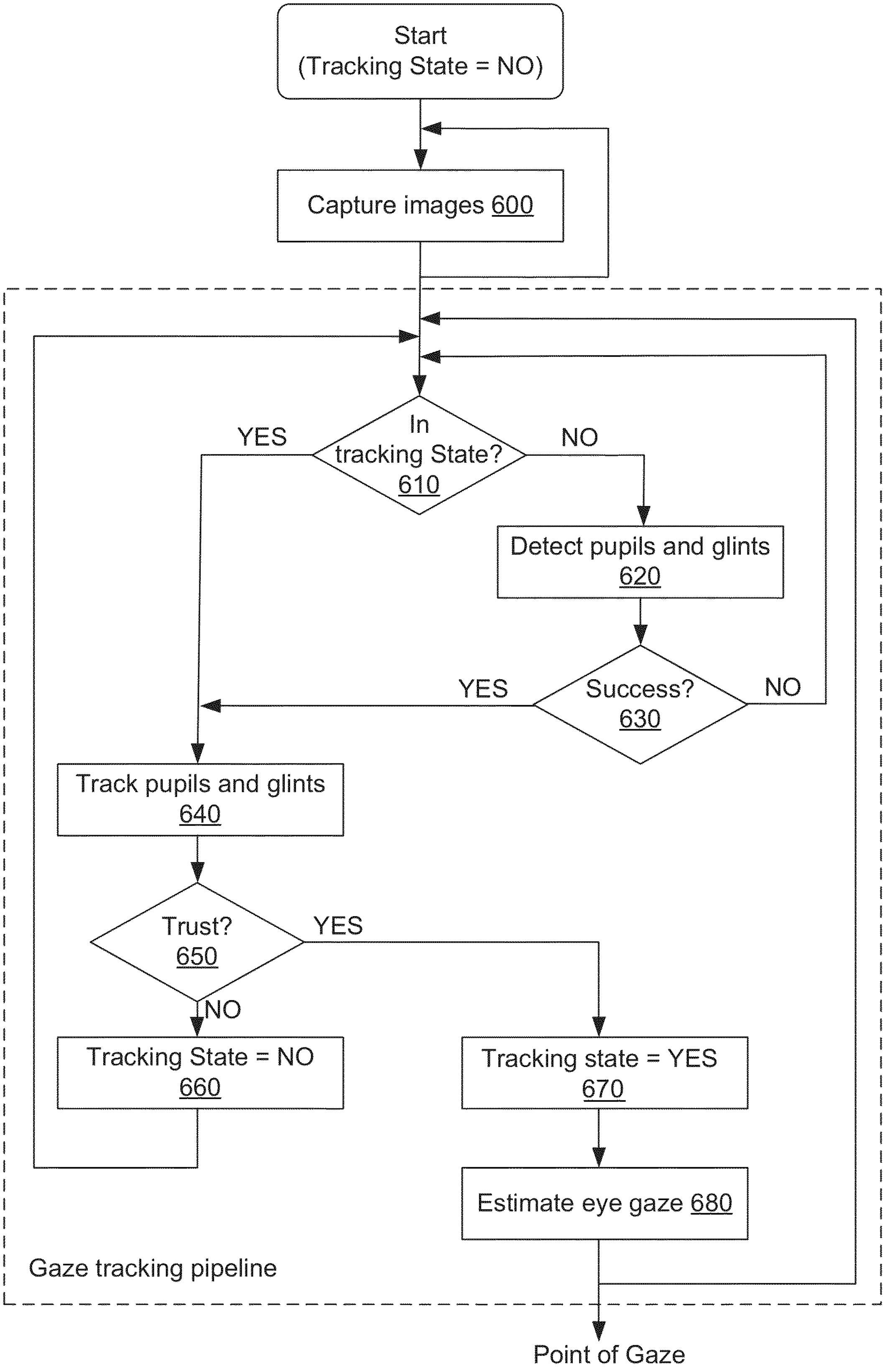
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real-world environment 602 are used to provide a XR experience to the user, for example, a mixed reality environment in which one or more virtual objects are superimposed over representations of real-world environment 602.

Thus, the description herein describes some embodiments of three-dimensional environments (e.g., XR environments) that include representations of real-world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head-mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with one or more display generation components and one or more input devices.

FIGS. 7A-7K illustrate examples of user interfaces for breath tracking. FIG. 8 is a flow diagram of an exemplary method 800 for providing a user interface for breath tracking that includes displaying particles with lighting characteristics that change over time. FIG. 9 is a flow diagram of an exemplary method 900 for providing a user interface for breath tracking that includes displaying particles that move based on whether a condition is met. The user interfaces in FIGS. 7A-7K are used to illustrate the processes described below, including processes 800 and 900 shown in FIGS. 8 and 9.

Figure 7A:
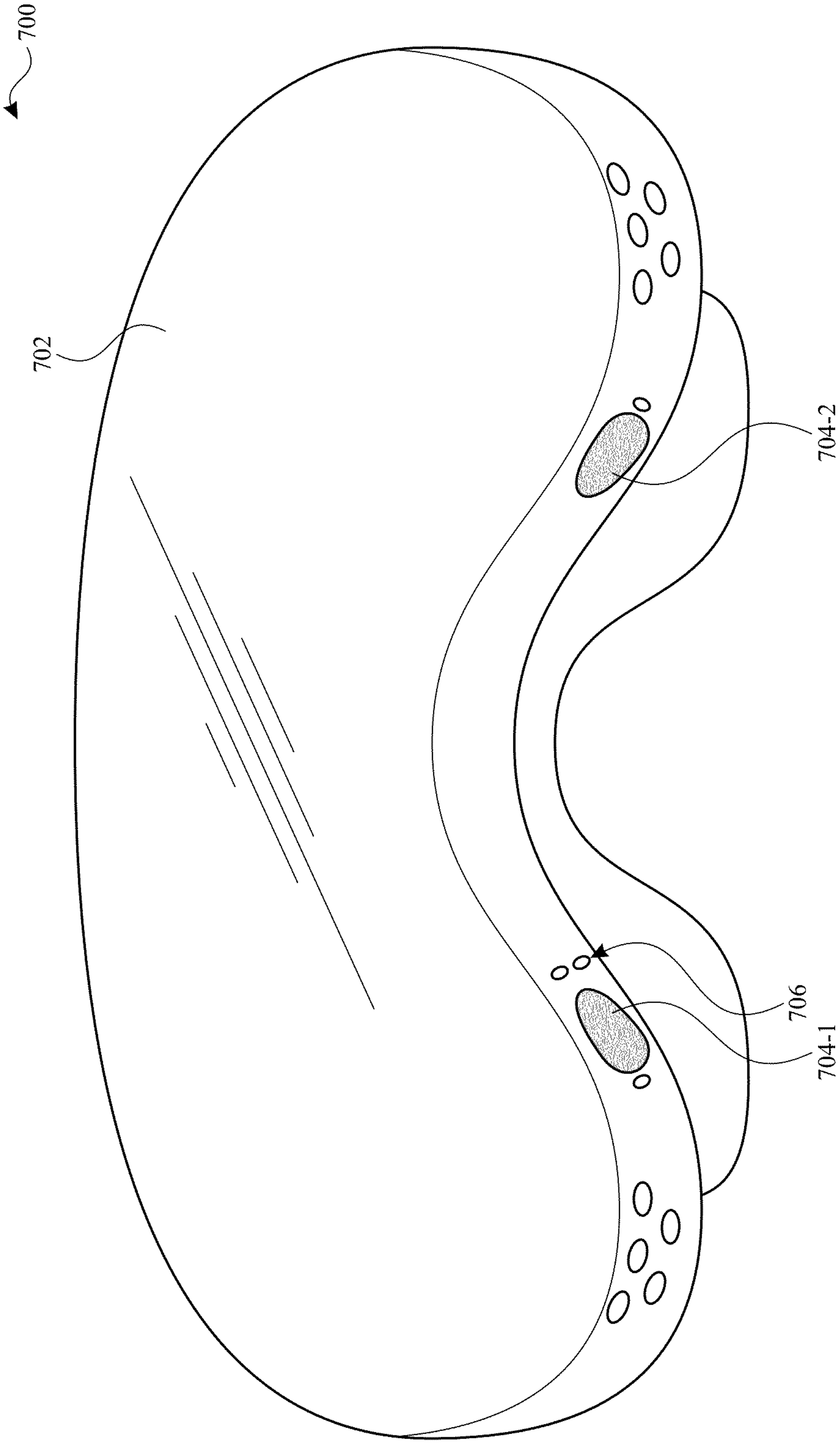
FIGS. 7A-7K illustrate example techniques for providing a user interface for breath tracking, in accordance with some embodiments.

FIG. 7A illustrates computer system 700, which is used to provide user experience sessions in an XR environment. The various embodiments are described with respect to an example user experience session provided by a meditation application operating on computer system 700. The user experience session is referred to as a "mindfulness session." In some embodiments, a mindfulness session is a user experience session that helps a user bring awareness or mindfulness to the present moment, to the user's mind, and/or to the user's body. In some embodiments, the mindfulness session includes a breathing portion, which provides an opportunity for a user to focus on the user's breathing. As described below, a mindfulness session has various visual characteristics, such as virtual objects (e.g., shapes, particles, and/or user interfaces) and/or visual effects.

As illustrated in FIG. 7A, computer system 700 is a head-mounted device (HMD). In some embodiments, computer system 700 is a smartphone, a tablet computer, a laptop computer, desktop computer, and/or an extended reality device. In some embodiments, computer system 700 includes one or more display generation components, such as display 702. In some embodiments, computer system 700 includes one or more input devices, which allow user 720 to interact with and control computer system 700. In some embodiments, the one or more input devices include one or more camera sensors, such as camera sensor 704-1 and camera sensor 704-2 (e.g., the same as, or different from, downward cameras 6-114 and/or jaw cameras 6-116). In some embodiments, the one or more input devices include one or more microphone sensors 706. Additionally, in some embodiments, computer system 700 includes one or more audio output devices and/or speakers, which output tones, music, verbal communications, and/or other audio. In some embodiments, computer system 700 includes one or more features of computer system 101.

Figure 7C:
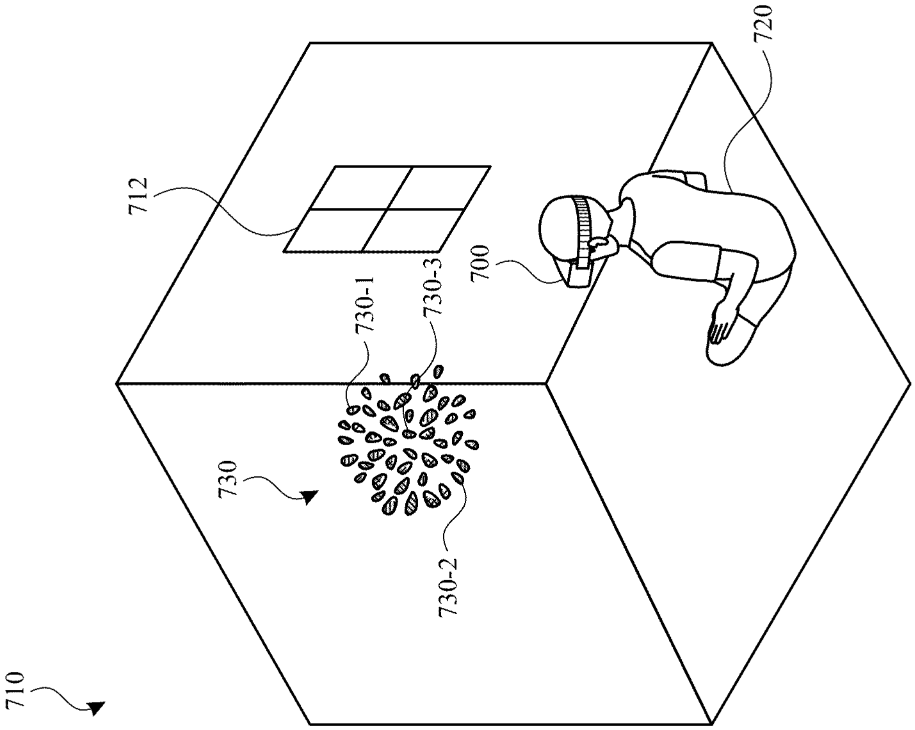
Figure 7B:
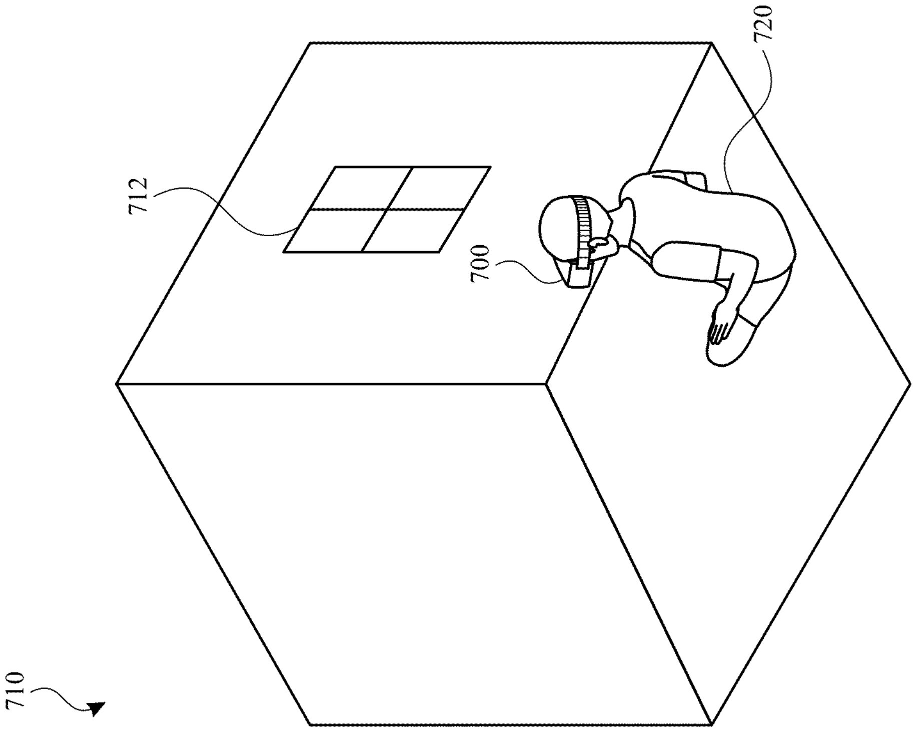

As shown in FIG. 7B, user 720 wears computer system 700 on his head. In some embodiments, camera sensor 704-1 and camera sensor 704-2 are downward and/or outward facing, as shown in FIG. 7A. Accordingly, when user 720 wears computer system 700 on his head, camera sensor 704-1 and camera sensor 704-2 are directed downward and outward towards the user's body, allowing camera sensor 704-1 and camera sensor 704-2 to detect movement of the user's chest and/or stomach corresponding to the user's breathing. In some embodiments, the one or more microphone sensors 706 detect sounds of air movement corresponding to the user's breathing. Accordingly, computer system 700 is able to detect, via camera sensor 704-1, camera sensor 704-2, and/or microphone sensor 706, breath information of user 720.

FIG. 7B depicts user 720 sitting in physical environment 710. In the example shown, physical environment 710 is a physical room that includes physical window 712. In some embodiments, display 702 is transparent and/or translucent, allowing user 720 to directly view physical environment 710, including physical window 712. In some embodiments, display 702 is opaque. When display 702 is opaque, in some embodiments, physical elements of the user's physical environment are displayed on display 702, allowing user 720 to view physical environment 710 while wearing computer system 700.

In some embodiments, virtual objects are displayed on display 702, such that user 720 perceives the virtual objects as being located in physical environment 710 (e.g., while user 720 is wearing computer system 700). For example, during a breathing portion of a mindfulness session, virtual object 730 appears to hover in physical environment 710 a short distance in front of user 720, as shown in FIG. 7C. In some embodiments, virtual object 730 represents the breath of user 720. For example, virtual object 730 is comprised of a plurality of particles, including particle 730-1, particle 730-2, and particle 730-3, which move (e.g., expand and contract) based on detected breath information (e.g., inhales and exhales).

In some embodiments, the arrangement of individual particles gives virtual object 730 a general macro shape. In some embodiments, virtual object 730 has a general three-dimensional shape, such as a sphere, orb, cube, pyramid, rectangular prism, other (e.g., cloud), or abstract three-dimensional shape. In some embodiments, virtual object 730 has a general two-dimension shape, such as a circle, square, triangle, rectangle, or abstract two-dimensional shape. In some embodiments, virtual object 730 forms a moving arrangement, such as floating mist or swirling paintbrush strokes. In the example illustrated by FIGS. 7C through 7E, virtual object 730 generally has a spherical shape.

In some embodiments, the individual particles, including particle 730-1, particle 730-2, and particle 730-3, have a shape. For example, the individual particles may be shaped like petals, leaves, confetti, droplets, circles, spheres, squares, cubes, pyramids, clouds, paintbrush strokes, or a combination thereof. In some embodiments, the shape of individual particles correspond to the macro shape of virtual object 730, such as a cubical virtual object comprised of a plurality of cubical particles. In the example illustrated in FIGS. 7C through 7E, virtual object 730 is comprised of a plurality of particles shaped like petals, which together form the spherical shape of virtual object 730.

Figure 7E:
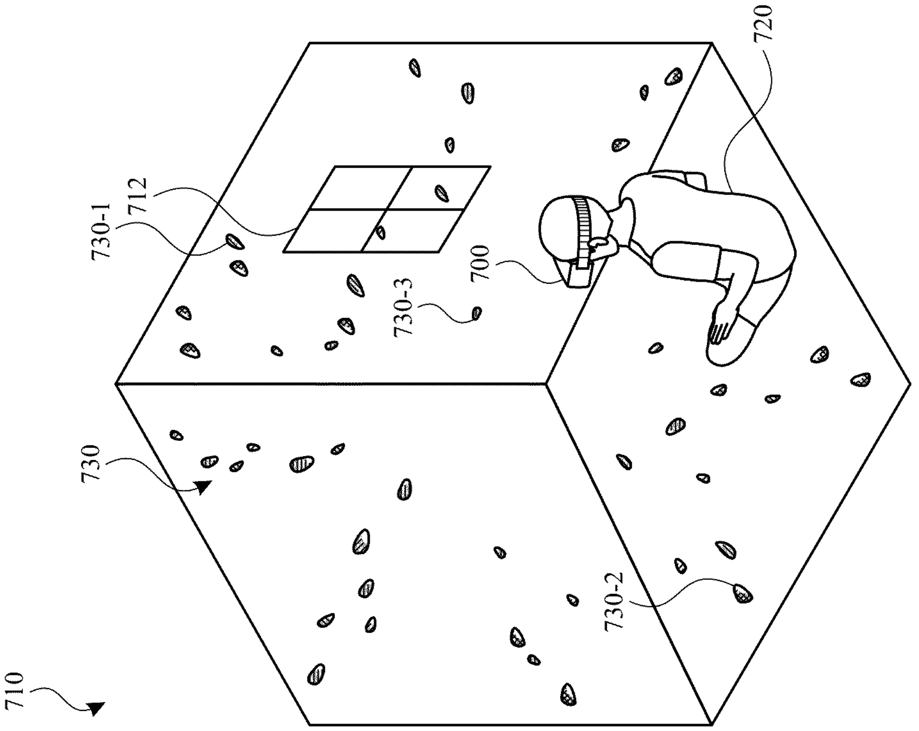
Figure 7D:
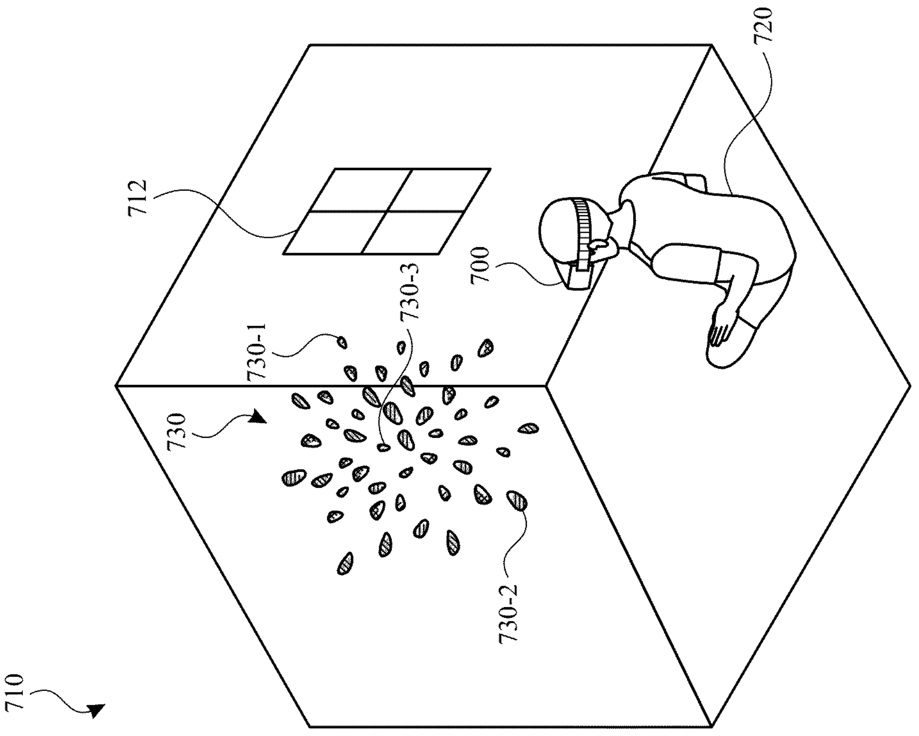

In some embodiments, in order to help user 720 draw attention to his breath during a breathing portion of a mindfulness session, computer system 700 moves the plurality of particles in virtual object 730 based on detected breath information (e.g., the information detected by camera sensor 704-1, camera sensor 704-2, and/or microphone sensor 706). For example, the plurality of particles in virtual object 730 expand (e.g., move apart) as user 720 inhales, as illustrated in FIGS. 7C through 7E. Conversely, the plurality of particles in virtual object 730 contract (e.g., move together) as user 720 exhales, as illustrated by FIGS. 7E through 7C. In some embodiments, the movement of the plurality of particles gives the perception that the user's breath is influencing the particles (e.g., blowing the particles away and sucking the particles back in). In some embodiments, audio is output in coordination with the movement of virtual object 730. For example, computer system 700 may output tones, music, and/or guided meditations to further help user 720 relax and focus on his breath.

In some embodiments, individual particles move independently. For example, particle 730-1, particle 730-2, and particle 730-3 move (e.g., translate and/or rotate) in different manners, such as at different speeds and/or accelerations. In some embodiments, noise and/or variation is introduced, causing the individual particles to move in different ways, in order to give an organic feel to the movement and/or to add variety to the movement.

In some embodiments, the magnitude of movement is smaller for particles in the user's peripheral vision (e.g., along the edges of display 702) in order to minimize potential motion sickness for user 720 that can arise in XR environments. For example, in FIG. 7H, the magnitude of movement of particles located near the outside edge of display 702, such as particle 730-1 and 730-2, is less than the magnitude of movement of particles located near the center of virtual object 730, such as particle 730-3. In some embodiments, computer system 700 changes a lighting characteristic for a respective particle at the periphery of display 702 in order to give the appearance of more significant motion to user 720 while minimizing the actual movement (e.g., translation) on display 702. Such changes to the lighting characteristic are discussed in more detail below with respect to FIGS. 7F through 7J.

In some embodiments, the rate of movement (e.g., speed and/or acceleration) of a respective particle varies throughout the user's breath cycle. For example, a respective particle may initially move quickly as a user begins an inhale and the respective particle may slow towards the end of the inhale, coinciding with the user's natural breath cycle. Similarly, in some embodiments, a respective particle will slow to a stop in conjunction with the pause between the user's breath (e.g., in-breath hold and/or out-breath hold).

In some embodiments, there is a delay between the user's actual breath and the point in time when computer system 700 moves the plurality of particles based on the detected breath. In some embodiments, as illustrated in FIG. 7C, virtual object 730 is displayed a short distance in front of user 720, as opposed to at the user's mouth, so any perceived lag feels more acceptable. In some embodiments, computer system 700 anticipates a transition in breath cycle (e.g., from an inhale to an exhale, or vice versa) and begins to slow the movements of the plurality of particles based on the expectation of an inflection point between an in-breath and an out-breath although computer system 700 may not have detected breath information that indicates such a change. In some embodiments, the anticipated transition in the user's breath is based on the breath information for the plurality of previous breaths.

FIGS. 7C through 7E provide a perspective view of what user 720 sees, via display 702, when a meditation application is active and a breathing portion of a mindfulness session is ongoing on computer system 700. However, in the example shown, virtual object 730 is only visible via display 702 and, therefore, is not visible to a third-party observing user 720 during a mindfulness session (e.g., a third-party observing user 720 during a mindfulness session would see the room as shown in FIG. 7B without virtual objects and/or virtual overlays). As discussed in more detail below, FIGS. 7F through 7J illustrate user interfaces displayed on display 702 and seen by user 720 during a breathing portion of a mindfulness session.

As mentioned above, in some embodiments, display 702 is translucent or otherwise allows user 720 to view or perceive elements of physical environment 710, such as physical window 712 depicted in FIGS. 7F through 7J. In some embodiments, the visibility of physical environment is reduced (e.g., dimmed) in order to help user 720 focus on his breathing and/or on a mindfulness session. For example, visibility of physical environment 710 may be reduced to 10% (e.g., 90% opacity), in which case physical environment 710 and physical window 712 would be less apparent on display 702. Maintaining some amount of visibility (e.g., 10% visibility) helps user 720 feel grounded in physical environment 710 and minimizes potential motion sickness that can arise in XR environments. In some embodiments, the visibility (and therefore also opacity) vary throughout a mindfulness session. In some embodiments, visibility is further reduced (e.g., dimmed) along the perimeter of display 702, as illustrated by the gradient around the edges of display 702 in FIGS. 7F through 7J.

In some embodiments, one or more of the particles have a lighting characteristic, such as a simulated light effect (e.g., a glow and/or backlighting), reflectiveness, and/or brightness. In some embodiments, the lighting characteristic for a respective particle changes over time. Additionally, or alternatively, in some embodiments, one or more particles have an animation, translucence, coloring, shading, pattern, and/or other appearance that changes over time. Changes in lighting characteristic and/or appearance are represented in FIGS. 7C-7J by changes in shading and patterns.

In some embodiments, the lighting characteristic for a respective particle changes based on the magnitude of movement of the respective particle. The change in lighting characteristic illustrated in FIG. 7F through FIG. 7J is a change in brightness. For example, as particle 730-1 moves from the position shown in FIG. 7F to the position shown in FIG. 7G to the position shown in FIG. 7H, the brightness of particle 730-1 also changes, at least in part, based on the speed and/or acceleration of the movement (e.g., translation and/or rotation). The change in brightness is represented by a change in the amount of shading and pattern shown on particle 730-1.

In some embodiments, the magnitude (and/or the significance) of the change is inversely related to the magnitude of movement of the respective particle. For example, in some embodiments, particle 730-1 moves at a slower speed and/or a slower rate than particle 730-3 (in some embodiments, because particle 730-1 is located near the edge of display 702 and computer system 700 is minimizing movement of particles in the user's peripheral vision). In some embodiments, because 730-1 moves at a slower speed and/or changes at a slower rate than particle 730-3, the brightness of particle 730-1 increases more significantly than particle 730-3. In some embodiments, because particle 730-3 moves at a faster speed and/or a faster rate than particle 730-1, the brightness of particle 730-3 changes less dramatically than particle 730-1.

Figure 7F:
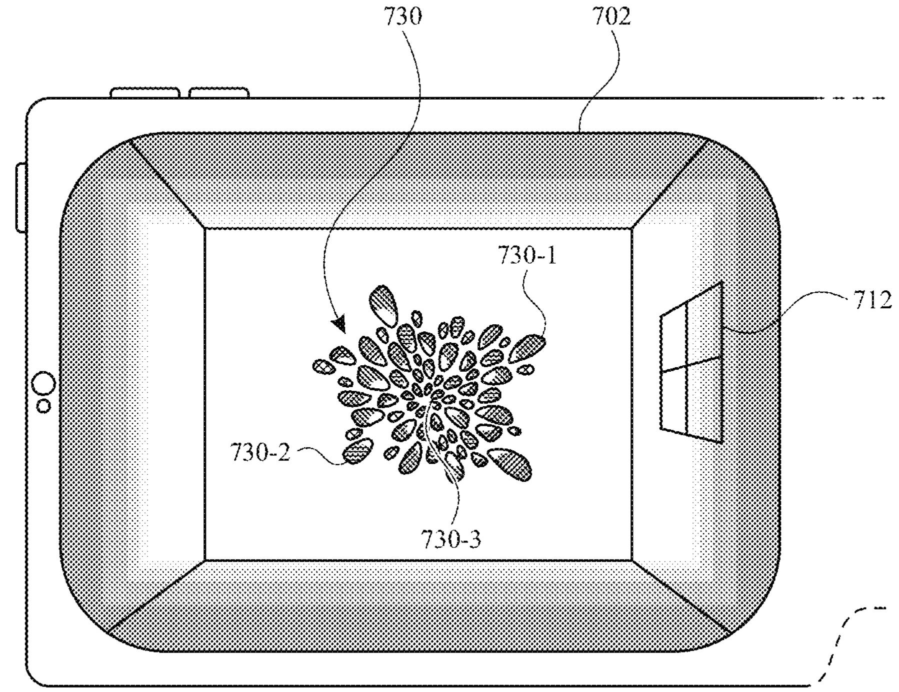
Figure 7G:
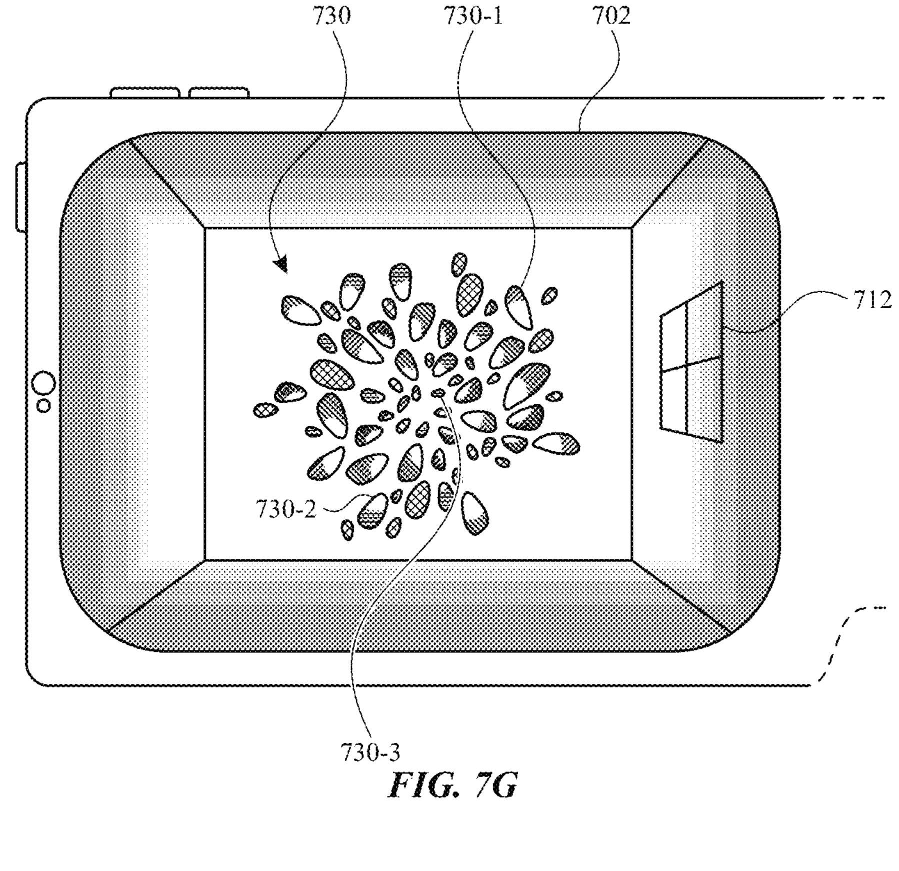

In some embodiments, the change in lighting characteristic is based on a movement threshold. For example, if the magnitude of movement for a respective particle is above a movement threshold, the lighting characteristic increases, as illustrated by particle 730-1 in FIGS. 7F and 7G. The transition from FIG. 7F to FIG. 7G illustrates how virtual object 730 changes during the early portion of a user's inhale. More specifically, in general, the plurality of particles quickly move from the locations shown in FIG. 7F to the locations shown in FIG. 7G during the quicker portion of the user's inhale. In this example, the magnitude of movement (e.g., speed and/or acceleration) of particle 730-1 is above a movement threshold and, therefore, the brightness of particle 730-1 increases in FIG. 7G from what it was in FIG. 7F.

Figure 7H:
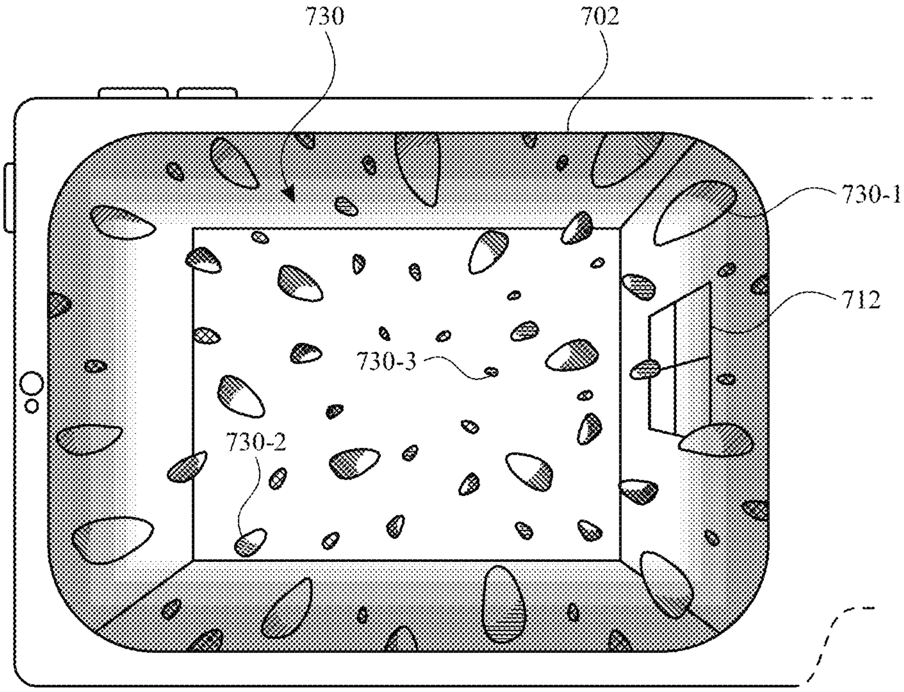
Figure 7I:
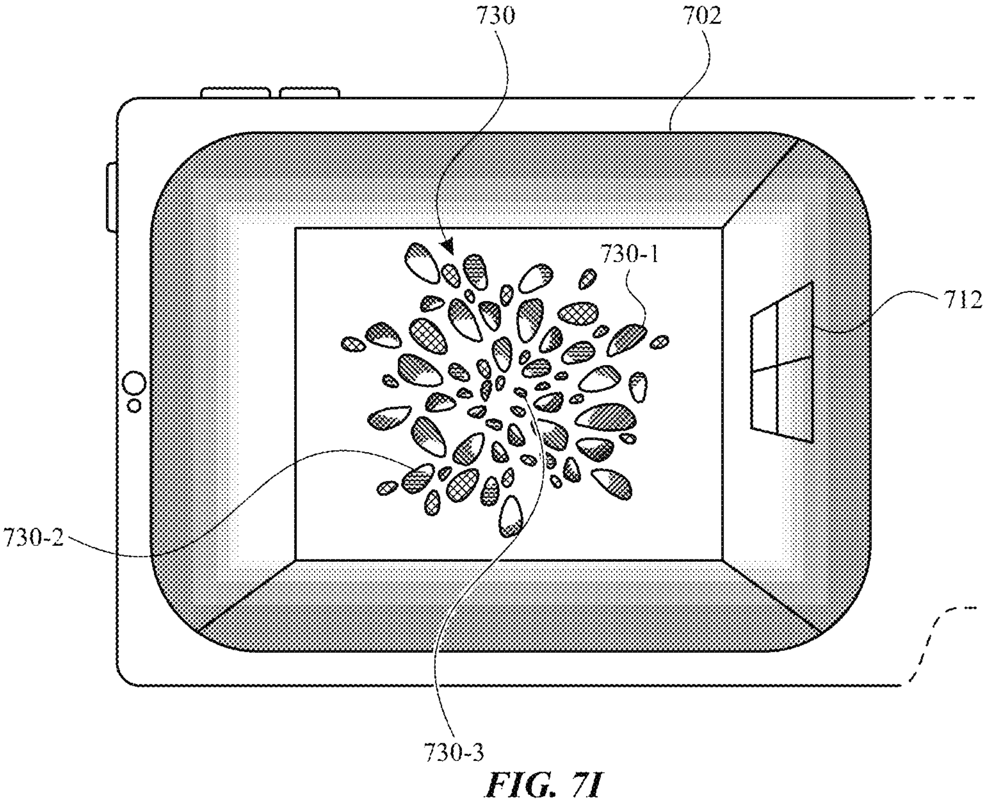
Figure 7J:
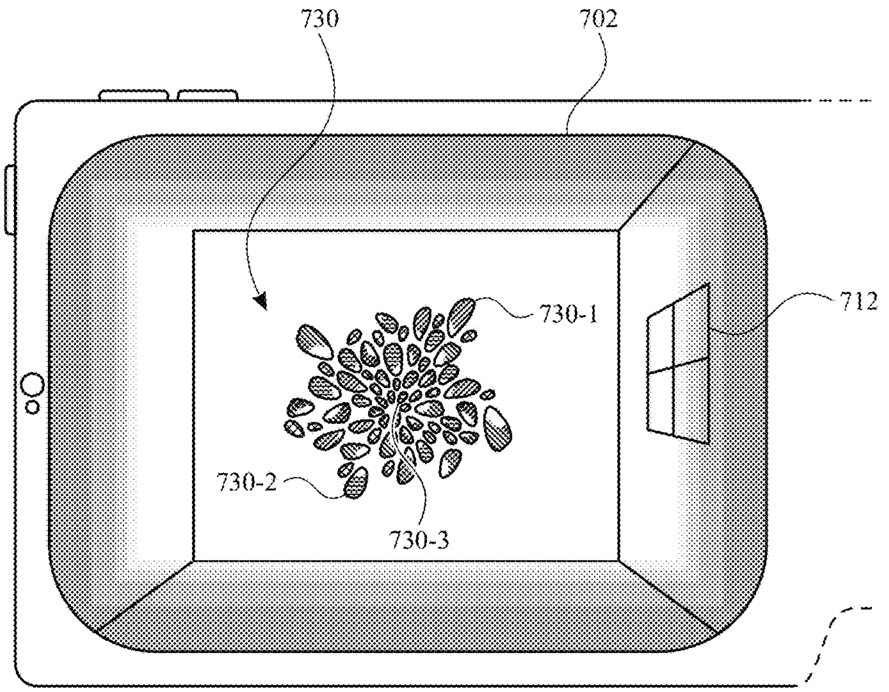

In some embodiments, if the magnitude of movement for a respective particle is below the movement threshold, the lighting characteristic does not change (and/or is maintained), as illustrated by particle 730-2 in FIGS. 7G and 7H. The transition from FIG. 7G to FIG. 7H illustrates how virtual object 730 changes during the end portion of a user's inhale. More specifically, the plurality of particles slow to a stop and remain in place during the natural pause (e.g., in-breath hold) between the user's inhale and subsequent exhale. In this example, the magnitude of movement (e.g., speed and/or acceleration) of particle 730-2 is below a movement threshold and, therefore, the brightness for particle 730-2 remains the same in FIG. 7H as it was in FIG. 7G.

FIGS. 7F through 7J illustrate other conditions, as well. For example, in some embodiments, if the magnitude of movement of a respective particle is above a movement threshold, the lighting characteristic increases and, if the magnitude of movement of the respective particle is below the movement threshold, the lighting characteristic decreases. Similarly, in some embodiments, if a respective particle is moving at a first rate, the lighting characteristic of a respective particle is displayed at first level and, if the respective particle is moving at a second rate, the lighting characteristic of the first particle is displayed at second level.

As discussed above, computer system 700 detects breath information of user 720. For example, computer system 700 uses camera sensor 704-1 and camera sensor 704-2 to detect movement of the user's stomach and/or chest area corresponding to the user's breath. Additionally, or alternatively, in some embodiments, computer system 700 uses microphone sensor 706 to detect the sound of air movements corresponding to the user's breath. In some embodiments, breath information is continuously detected while a breathing portion of a mindfulness session is ongoing. Thus, while the breathing portion of the mindfulness session is ongoing, computer system 700 possesses detected breath information for a current breath, as well as a plurality of previous breaths.

In some embodiments, in order to determine whether and/or how to move the plurality of particles on display 702, computer system 700 makes a determination regarding whether a condition is met. If the condition is met, computer system 700 moves the plurality of particles based on breath information for the current breath (e.g., without using breath information for previous breaths). For example, if the condition is met, the movement of particles from FIG. 7H to FIG. 7I to FIG. 7J would be based on the user's current exhale (e.g., and not previous exhales). If the condition is not met, computer system 700 moves the plurality of particles based on breath information for the plurality of previous breaths and, optionally, not based on the current breath in order to provide a more cohesive experience for user 720. In this case, if the condition is not met, the movement of particles from FIG. 7H to FIG. 7I to FIG. 7J would be based on exhale information for a plurality of previous breaths.

In some embodiments, the condition is related to the perceived quality of the detected breath information and/or the confidence level (e.g., in the accuracy and/or reliability of the detected breath information). In some embodiments, the condition includes a set of one or more criteria being met, such as a set of one or more criteria corresponding to a high confidence level. For example, in some instances, computer system 700 will detect several similar and/or consistent breaths, which would result in a high perceived quality and/or a high confidence level. However, in some instances, computer system 700 does not detect breath information and/or the detected breath information may not seem representative of the user's actual breath, which would result in a low perceived quality and/or a low confidence level.

In some embodiments, whether the set of one or more criteria corresponding to the high confidence level is met is determined, at least in part, based on whether the detected breath information is within expected bounds. For example, computer system 700 determines whether the speed, duration, and/or rate of the current breath is within the expected bounds (e.g., the upper and lower limits for a typical breath). In some embodiments, the determinations are dynamic for each mindfulness session, meaning expected bounds vary from user to user and from session to session. In some embodiments, a determination regarding whether the set of one or more criteria is made based portions of the breath, such as an in-breath (inhale), an in-breath hold, an out-breath (exhale), and/or out-breath hold.

In some embodiments, the determination regarding the set of one or more criteria corresponding to a high confidence level is made based on more than one breath cycle. For example, three breath cycles may be used to determine whether the set of one or more criteria corresponding to a high confidence level is met. In some embodiments, the three breath cycles include information regarding the current breath and two immediately preceding breaths.

In some embodiments, a different number of breath cycles is used when determining high confidence than when determining low confidence. In some embodiments, the number of breath cycles used to determine high confidence is higher than the number of breath cycles used to determine low confidence. For example, the set of one or more criteria regarding low confidence may be based on three breath cycles. Therefore, if one of the previous three breaths is deemed poor quality, the low confidence criteria is met and the plurality of particles will begin moving based on breath information for a plurality of previous breaths and not based on the breath information for the current breath. In some embodiments, the plurality of particles continue to be moved based on breath information for the plurality of breaths and not based on breath information for the current breath.

In some embodiments, the set of one or more criteria regarding high confidence may be based on ten cycles. As a result, ten high-confidence breath cycles are required to meet the set of one or more criteria for high confidence so that, once again, the plurality of particles move based on the current breath data.

In some embodiments, when low confidence criteria is met, computer system 700 transitions from using breath information for the current breath to using breath information for a plurality of previous breaths and not using breath information for the current breath. For example, computer system 700 uses average of previous breath information, such as average of past 3 breaths. In some embodiments, the average of the previous breaths may be calculated using the breaths immediately preceding the current breath. In some embodiments, the average of the previous breaths may be calculated using the previous breaths that met the high confidence criteria (e.g., disregarding low confidence breath when calculating the average).

Figure 7K:
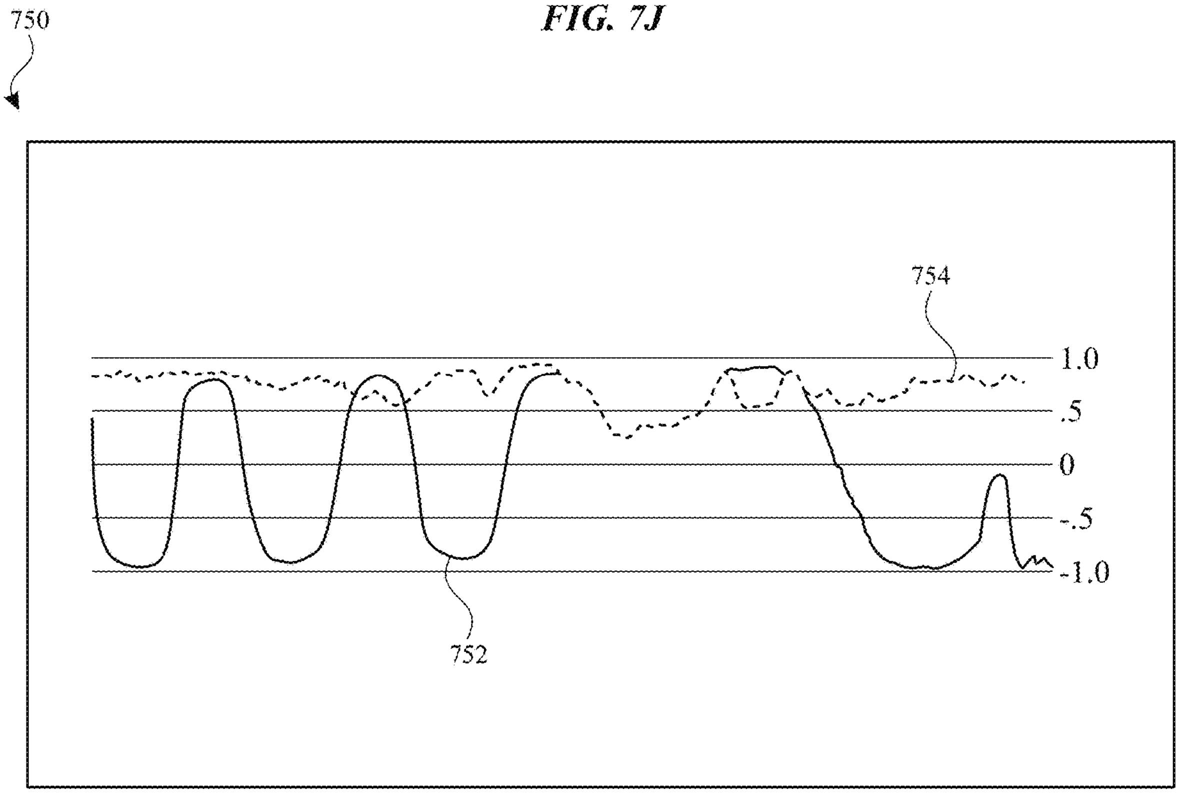

FIG. 7K depicts a graph of detected breath information. As represented by solid line 752, computer system 700 initially detects approximately three breath cycles with high confidence levels. The corresponding confidence level is represented by dotted line 754. After the initial three breath cycles, there is a period of time when no breath information is detected and, as a result, dotted line 754 dips to reflect a lowered confidence level. Then, computer system 700 once again detects breath information, represented by the reappearance of solid line 752; however, the confidence level represented by dotted line 754 remains low because the detected breath information no longer follows the pattern of the initial three breath cycles.

Additional descriptions regarding FIGS. 7A-7K are provided below in reference to method 800 described with respect to FIGS. 8 and 9.

FIG. 8 is a flow diagram of an exemplary method 800 for providing a user interface for breath tracking that includes displaying particles with lighting characteristics that change over time, in some embodiments. In some embodiments, method 800 is performed at a computer system (e.g., computer system 101 in FIG. 1A and/or computer system 700 in FIG. 7A, a smartphone, a smartwatch, a tablet computer, a laptop computer, a desktop computer, and/or a head-mounted device (e.g., a head mounted augmented reality and/or extended reality device)) that is in communication with one or more display generation components (e.g., display generation component 120 in FIGS. 1A, 3A, and 4 and/or display 702 in FIG. 7A) (e.g., a heads-up display, a display, a touchscreen, a projector, etc.) and one or more input devices (e.g., 704-1, 704-2, and/or 706 in FIG. 7A, a touch-sensitive surface, a touchscreen display, a button, a camera sensor, a keyboard, a mouse, a joystick, and/or a microphone). In some embodiments, method 800 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 800 are, optionally, combined and/or the order of some operations is, optionally, changed.

Computer system (e.g., 700) detects (802), via the one or more input devices, breath information (e.g., breath speed, breath duration, breath rate, and/or inhale and exhale information) for a user (e.g., 720) of the computer system. In some embodiments, breath information is detected via one or more camera sensors, such as by detecting the user's chest and/or stomach area expanding and contracting. In some embodiments, breath information is detected via one or more microphones, such as by detecting the sound of the user breathing. In some embodiments, computer system displays (804), via the one or more display generation components, a plurality of particles (e.g., 730, leaves, petals, confetti, and/or other shapes) that move (e.g., in a simulated three-dimension environment) based on the detected breath information, including: changing (806), over time, a lighting characteristic (e.g., a simulated light effect and/or brightness, coloring, shading, and/or pattern) of a first particle (e.g., 730-1) of the plurality of particles based on a magnitude (e.g., speed and/or acceleration) of movement (e.g., translation and/or rotation) of the first particle (e.g., and not based on a magnitude of movement of a second particle); and changing (808), over time, a lighting characteristic (e.g., a simulated light effect and/or brightness, coloring, shading, and/or pattern) of a second particle (e.g., 730-2) of the one or more particles, different from the first particle, based on a magnitude (e.g., speed and/or acceleration) of movement (e.g., translation and/or rotation) of the second particle (e.g., and not based on a magnitude of movement of the first particle). In some embodiments, the computer system changes the lighting characteristics of a respective particles as the magnitude of movement of the respective particle changes. In some embodiments, the change in lighting characteristic of a respective particle is optionally based on a change in the magnitude of movement of the respective particle. In some embodiments, the lighting characteristic of a respective particle changes in conjunction with the change in the magnitude of movement of the respective particle. Displaying a plurality of particles that move based on the detected breath information for a user of the computer system provides the user with a visual representation of the user's breath, thereby providing the user with improved visual feedback. Displaying a plurality of particles that move based on the detected breath information for a user of the computer system enables the user of the computer system to focus on the user's breath, thereby helping the user to relax, remove distractions, and reduce stress. Changing a lighting characteristic for a respective particle enables the computer system to simulate more significant movement without actually moving the particle as far, thereby reducing motion sickness for the user of the computer system.

In some embodiments, changing the lighting characteristic of the first particle (e.g., 730-1, 730-2, and/or 730-3) (and/or the second particle) includes changing a brightness of the first particle (and/or the second particle) (e.g., a brightness of a portion of the particle). In some embodiments, changing a brightness of a respective particle includes changing a simulated brightness of the respective particle, such as by changing coloring and/or shading of the respective particle. In some embodiments, changing a brightness includes changing a simulated light reflection (e.g., a highlight). Changing the brightness for a respective particle enables the computer system to simulate greater movements while minimizing the actual movement of particles, thereby reducing motion sickness for the user and providing an improved user experience.

In some embodiments, the computer system (e.g., 700) changes, over time, the lighting characteristic of the first particle (e.g., 730-1, 730-2, and/or 730-3) of the plurality of particles (e.g., 730-1) based on the magnitude of movement of the first particle. In some embodiments, in accordance with a determination that the magnitude of movement of the first particle is above (e.g., greater than and/or more than) a first movement threshold (e.g., a threshold speed and/or acceleration), the computer system changes the lighting characteristic of the first particle (e.g., based on the magnitude of movement). In some embodiments, in accordance with a determination that the magnitude of movement of the first particle is below (e.g., less than) the first movement threshold, the computer system maintains (or, in some embodiments, forgoes changing) the lighting characteristic of the first particle. In some embodiments, the lighting characteristic for the first particle remains the same while the particle moves slowly at the start of a user's inhale and the lighting characteristic for the first particle changes while the particle moves quickly in the middle of a user's inhale. In some embodiments, changing, over time, the lighting characteristic of a respective particle of the plurality of particles based on the magnitude of movement of the respective particle includes: in accordance with a determination that the magnitude of movement of the respective particle is above a first movement threshold, changing the lighting characteristic of the respective particle; and in accordance with a determination that the magnitude of movement of the respective particle is below the first movement threshold, maintaining the lighting characteristic for the respective particle. Changing the lighting characteristic for a respective particle in accordance with a determination that the magnitude of movement of the respective particle is above a first movement threshold performs an operation when a condition is met without requiring further user input and reducing the number of inputs required to perform an operation.

In some embodiments, changing, over time, the lighting characteristic of the first particle (e.g., 730-1, 730-2, and/or 730-3) of the plurality of particles (e.g., 730) based on the magnitude of movement of the first particle includes, in accordance with a determination that the magnitude of movement of the first particle is above (e.g., greater than and/or more than) a second movement threshold (e.g., a threshold speed and/or acceleration), increasing the lighting characteristic (e.g., increasing the brightness, increasing the coloring, and/or decreasing the shading) of the first particle. In some embodiments, changing, over time, the lighting characteristic of the first particle (e.g., 730-1, 730-2, and/or 730-3) of the plurality of particles (e.g., 730) based on the magnitude of movement of the first particle includes, in accordance with a determination that the magnitude of movement of the first particle is below (e.g., less than) the second movement threshold, decreasing the lighting characteristic (e.g., decreasing the brightness, decreasing the coloring, and/or increasing the shading) of the first particle. In some embodiments, the lighting characteristic for the first particle increases while the particle moves in a first direction and the lighting characteristic for the first particle decreases while the particle moves in a second direction. In some embodiments, the threshold for increasing the lighting characteristic of the first particle is different than the threshold for decreasing the lighting characteristic of the first particle. In some embodiments, the threshold for increasing the lighting characteristic of the first particle being a third threshold and the threshold for decreasing the lighting characteristic of the first particle being a fourth threshold. In some embodiments, in accordance with a determination that the magnitude of movement of the first particle is between the third threshold and the fourth threshold, the computer system maintains the lighting characteristic. In some embodiments, changing, over time, the lighting characteristic of a respective particle of the plurality of particles based on the magnitude of movement of the respective particle includes: in accordance with a determination that the magnitude of movement of the respective particle is above a second movement threshold, increasing the lighting characteristic of the respective particle; and in accordance with a determination that the magnitude of movement of the respective particle is below the second movement threshold, decreasing the lighting characteristic of the respective particle. Increasing the lighting characteristic for a respective particle in accordance with a determination that the respective particle is above a second threshold performs an operation when a condition is met without requiring further user input and reducing the number of inputs required to perform an operation. Decreasing the lighting characteristic for a respective particle in accordance with a determination that the respective particle is below a second threshold performs an operation when a condition is met without requiring further user input and reducing the number of inputs required to perform an operation.

In some embodiments, changing, over time, the lighting characteristic of the first particle (e.g., 730-1, 730-2, and/or 730-3) of the plurality of particles (e.g., 730) based on the magnitude of movement of the first particle includes, in accordance with a determination that the first particle is moving at a first rate (e.g., a first speed and/or acceleration), displaying the lighting characteristic of the first particle at a first level (e.g., a first brightness). In some embodiments, changing, over time, the lighting characteristic of the first particle (e.g., 730-1, 730-2, and/or 730-3) of the plurality of particles (e.g., 730) based on the magnitude of movement of the first particle includes, in accordance with a determination that the first particle is moving at a second rate (e.g., a second speed and/or acceleration) different from the first rate, displaying the lighting characteristic of the first particle at a second level (e.g., a second brightness) different from the first level. In some embodiments, the level of the lighting characteristic changes at the same rate of change as the movement of the first particle. In some embodiments, changing, over time, the lighting characteristic of a respective particle of the plurality of particles based on the magnitude of movement of the respective particle includes: in accordance with a determination that the respective particle is moving at a first respective rate, displaying the lighting characteristic at a first respective level; and in accordance with a determination that the respective particle is moving at a second respective rate different from the first respective rate, displaying the lighting characteristic of the respective particle at a second respective level different from the first respective level. Displaying a respective particle with a lighting characteristic at a first level in accordance with a determination that the respective particle is moving at a first rate performs an operation when a condition is met without requiring further user input and reducing the number of inputs required to perform an operation. Displaying a respective particle with a lighting characteristic at a second level in accordance with a determination that the respective particle is moving at a second rate performs an operation when a condition is met without requiring further user input and reducing the number of inputs required to perform an operation.

In some embodiments, during a first period of time (e.g., a first and/or earlier portion or sub-portion of a breath, such as the beginning of an inhale), the first particle (e.g., 730-1, 730-2, and/or 730-3) moves at the first rate. In some embodiments, during a second period of time (e.g., a second portion and/or later portion or sub-portion of the breath, such as the middle and/or end of the inhale), different from the first period of time, the first particle (e.g., 730-1, 730-2, and/or 730-3) moves at the second rate. In some embodiments, the rate of movement of the first particle changes as the user's breath changes. In some embodiments, the lighting characteristic for the first particle changes as the rate of movement of the first particle changes. In some embodiments, the rates of movement of respective particles of the plurality of particles vary over time. Displaying a respective particle moving at a first rate during a first period of time and at a second rate during a second period of time enables the computer system to display the respective particle moving at different rates based on a change in the user's breath rate, thereby providing the user with improved visual feedback.

In some embodiments, the first period of time is earlier than the second period of time and the first rate is faster than the second rate. In some embodiments, the particles move faster at the beginning of the breath (e.g., during the first period of time) than in the middle and/or at the end of the breath (e.g., during the second period of time). Displaying a respective particle moving faster at the beginning of a breath enables the computer system to minimize lag between detecting a user's breath and moving the respective particle on the display, thereby providing the user with improved visual feedback and an improved user experience.

In some embodiments, during a middle of a breath cycle, the computer system (e.g., 700) moves the first particle (e.g., 730-1, 730-2, and/or 730-3) at a third rate. In some embodiments, in anticipation of a transition in the breath cycle (e.g., a transition from an inhale to and exhale), the computer system moves the first particle at a fourth rate, wherein the fourth rate is slower than the third rate. In some embodiments, the first particle slows towards the end of a breath (e.g., the end of an inhale and/or the end of an exhale) in anticipation of an inflection point (e.g., the transition from an inhale to an exhale, or vice versa). Moving a respective particle at a fourth rate that is slower than the third rate in anticipation of a transition in the breath cycle provides a smoother transition in the displayed movement of the respective particle, thereby providing an improved user experience.

In some embodiments, for a first duration associated with a first portion of a breath (e.g., an inhale), the computer system (e.g., 700) moves the first particle (e.g., 730-1, 730-2, and/or 730-3) in a first direction (e.g., outward). In some embodiments, for a second duration associated with a second portion of the breath (e.g., an exhale), the computer system moves the first particle in a second direction, different than the first direction (e.g., the opposite direction of the first direction) (e.g., inward). In some embodiments, for a period of time between the first duration and the second duration, the computer system maintains the position of (e.g., ceases to move and/or ceases to translate) the first particle. In some embodiments, the first particle slows and/or stops at an inflection point between portions of a breath (e.g., at the hold between an inhale and an exhale and/or at the hold between an exhale and an inhale). Maintaining the position of a respective particle for a period of time between the first duration and the second duration provides the user with an indication of a hold between breaths, thereby providing the user with improved visual feedback.

In some embodiments, for a third duration associated with a third portion of a breath (e.g., an exhale and/or the start of an exhale), the computer system (e.g., 700) moves the first particle (e.g., 730-1, 730-2, and/or 730-3) at a first rate. In some embodiments, for a fourth duration associated with a fourth portion of a breath (e.g., an inhale and/or the start of an inhale), the computer system moves the first particle at a second rate that is slower than the first rate. In some embodiments, the first particle moves faster when the user in exhaling than when the user is inhaling. Moving a respective particle at a first rate for a third duration associated with a third portion of a breath and at a second rate for a fourth duration associated with a fourth portion of the breath provides the user with an indication of the portion of the breath, thereby providing the user with improved visual feedback. Moving the particle faster during an exhale and moving the particle slower during an inhale balances the amount of movement for different portions of the breath (that do not take the same amount of time), thereby providing the user with an improved experience.

In some embodiments, the computer system (e.g., 700) changes (e.g., moves and/or changes the lighting characteristic of) the first particle (e.g., 730-1) in a first manner and changes (e.g., moves and/or changes the lighting characteristic of) the second particle (e.g., 730-2) in a second manner different from the first manner (e.g., at a different speed, in a different direction, and/or in a different way, such as translating, rotating, and/or changing the lighting characteristic differently), wherein the change to the first particle and the change to the second particle are based on (e.g., are coordinated with and/or coincide with) the detected breath information. In some embodiments, the plurality of particles move and/or change in a coordinated way based on the detected breath information, but each individual particle has the appearance of moving differently (such as one particle translating, rotating, and/or changing lighting characteristic differently than another particle). Changing the first particle in a first manner and changing the second particle in a second manner, wherein the changes to the first particle and second particle are based on the detected breath information, enables the computer system to change individual particles in different manners, such as in a way to minimize motion sickness for a user, while presenting the detected breath information to the user through the plurality of particles, thereby providing the user with improved visual feedback.

In some embodiments, the change in the lighting characteristic of the first particle (e.g., 730-1) is independent from (e.g., separate and/or different from) the change in the lighting characteristic of the second particle (e.g., 730-2). Changing the lighting characteristic of the first particle independently from the change in the second particle enables the computer system to change individual particles independently, such as in a manner to minimize motion sickness for a user, while presenting the detected breath information to the user through the plurality of particles, thereby providing the user with improved visual feedback.

In some embodiments, the computer system (e.g., 700) moves the first particle (e.g., 730-1) with a first variation (e.g., a first speed, acceleration, path of travel, and/or rotation and/or a first change in speed, acceleration, path of travel, and/or rotation) and the computer system moves the second particle with a second variation (e.g., 730-2) (e.g., a second speed, acceleration, path of travel, and/or rotation and/or a second change in speed, acceleration, path of travel, and/or rotation) different from the first variation. In some embodiments, each of the individual particles in the plurality of particles move with variation (e.g., appear to translate and/or rotate differently). Moving the first particle with a first variation and moving the second particle with a second variation enables the computer system to move the particles in a seemingly natural (e.g., organic) way while presenting the detected breath information to the user through the plurality of particles, thereby providing the user with improved visual feedback.

In some embodiments, the plurality of particles (e.g., 730) (e.g., as a whole) appear to move (e.g., in a simulated three-dimension environment), based on the detected breath information, in a spherical (or, in some embodiments, circular) pattern. In some embodiments, the center of the plurality of particles is located along an axis that extends from the user's mouth in front of the user (e.g., in the z-direction). In some embodiments, the plurality of particles form a spherical shape and the particles in the plurality of particles move away from the center point of the sphere (e.g., the plurality of particles expand, such as when the user inhales) and toward the center point of the sphere (e.g., the plurality of particles contract, such as when the user exhales). In some embodiments, the user's breath creates a sphere of influence that acts on the plurality of particles, wherein the influence and/or effect of a user's breath radiates outward (e.g., in a two-dimensional circle and/or a three-dimensional sphere). Moving the plurality of particles with an appearance of moving in a spherical pattern allows for greater movement of particles in the center of the sphere than at the edges of the sphere, which allows the computer system to minimize the movement of particles in the user's peripheral vision, thereby reducing motion sickness for the user and providing an improved user experience.

In some embodiments, the first particle (e.g., 730-1) is located closer to the center of the spherical pattern than the second particle (e.g., 730-2) and wherein a magnitude of movement (e.g., translation and/or rotation) of the first particle is greater than a magnitude of movement (e.g., translation and/or rotation) of the second particle. In some embodiments, the particles located towards the center of the plurality of particles move more (e.g., farther and/or faster) than the particles located towards the outside of the plurality of particles. Moving the first particle that is located closer to the center of the spherical pattern more than the second particle that is located farther from the center of the spherical pattern minimizes the movement of particles in the user's peripheral vision, thereby reducing motion sickness for the user and providing an improved user experience.

In some embodiments, the computer system (e.g., 700) changes, over time, a color (e.g., a shade, tone, hue, and/or gradient) of the first particle (e.g., 730-1) based on the magnitude of movement of the first particle. In some embodiments, the computer system changes, over time, a color (e.g., a shade, tone, hue, and/or gradient) of the second particle (e.g., 730-2) based on the magnitude of movement of the second particle. Changing a color of the first particle based on the magnitude of movement of the first particle and changing a color of the second particle based on the magnitude of movement of the second particle enables the computer system to simulate greater movements while minimizing the actual movement of particles, thereby reducing motion sickness for the user and providing an improved user experience.

FIG. 9 is a flow diagram of an exemplary method 900 for interacting with a three-dimensional environment using predefined input gestures, in some embodiments. In some embodiments, method 900 is performed at a computer system (e.g., computer system 101 in FIG. 1A and/or computer system 700 in FIG. 7A, a smartphone, a smartwatch, a tablet computer, a laptop computer, a desktop computer, and/or a head-mounted device (e.g., a head mounted augmented reality and/or extended reality device)) that is in communication with one or more display generation components (e.g., display generation component 120 in FIGS. 1A, 3A, and 4 and/or display 702 in FIG. 7A) (e.g., a heads-up display, a display, a touchscreen, a projector, etc.) and one or more input devices (e.g., 704-1, 704-2, and/or 706 in FIG. 7A, a touch-sensitive surface, a touchscreen display, a button, a camera sensor, a keyboard, a mouse, a joystick, and/or a microphone). In some embodiments, method 900 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 900 are, optionally, combined and/or the order of some operations is, optionally, changed.

Computer system (e.g., 700) displays (902), via the one or more display generation components, a plurality of particles (e.g., 730, leaves, petals, confetti, and/or other shapes). In some embodiments, the particles are displayed as part of an extended reality environment. In some embodiments, the particles appear to be floating in the air, such as hovering in the space surrounding the user. In some embodiments, the computer system detects (904) (e.g., while displaying the plurality of particles), via the one or more input devices, breath information (e.g., breath speed, breath duration, breath rate and/or inhale and exhale information) for a plurality of breaths for a user (e.g., 720) of the computer system. In some embodiments, breath information is detected via one or more camera sensors, such as by detecting the user's chest and/or stomach area expanding and contracting. In some embodiments, breath information is detected via one or more microphones, such as by detecting the sound of the user breathing. In some embodiments, the computer system moves the plurality of particles based on the breath information for respective breaths of the plurality of breaths (e.g., prior to detecting the breath information for the current breath). In some embodiments, subsequent to detecting breath information for the plurality of breaths and while displaying the plurality of particles, the computer system detects (906) breath information for at least a portion of a current breath. In some embodiments, in response to detecting breath information for at least the portion of the current breath (908), in accordance with a determination that a condition is met (e.g., breath information for current breath (e.g., the portion of the current breath) meets high confidence criteria), the computer system moves (910) (e.g., in a simulated three-dimension environment) the plurality of particles based on the breath information for the current breath (and, optionally, not based on breath information for the plurality of breaths). In some embodiments, the particles move outward as the user exhales and/or inward as the user inhales. In some embodiments, the movement of the particles based on the current breath starts and/or occurs before the completion of the current breath (e.g., the particles begin moving before the end of the exhale). In some embodiments, in response to detecting breath information for at least the portion of the current breath, in accordance with a determination that the condition is not met (e.g., breath information for current breath (e.g., the portion of the current breath) does not meet high confident criteria and/or breath information for current breath (e.g., the portion of the current breath) meets low confidence breathing criteria), the computer system moves (912) (e.g., in the simulated three-dimension environment) the plurality of particles based on the breath information for the plurality of breaths (e.g., an average of the plurality of breaths) and not based on the breath information for the current breath. Displaying a plurality of particles that move based on the detected breath information for a user of the computer system provides the user with a visual representation of the user's breath, thereby providing the user with improved visual feedback. Displaying a plurality of particles that move based on the detected breath information for a user of the computer system enables the user of the computer system to focus on the user's breath, thereby helping the user to relax, remove distractions, and reduce stress. Moving the plurality of particles based on current breath information in response to detecting breath information for at least a portion of the current breath and in accordance with a determination that a condition is met performs an operation when a condition is met without requiring further user input and reducing the number of inputs required to perform an operation. Moving the plurality of particles based on the breath information for the plurality of breaths and not based on the breath information for the current breath performs an operation when a condition is met without requiring further user input and reducing the number of inputs required to perform an operation.

In some embodiments, the plurality of breaths includes a first breath, a second breath different from the first breath, and a third breath different from the first breath and the second breath. In some embodiments, in accordance with a determination that the first breath meets a set of one or more criteria (e.g., high confidence criteria), the computer system (e.g., 700) moves (e.g., in a simulated three-dimension environment) the plurality of particles (e.g., 730) based on the breath information detected for the first breath (and not based on breath information detected for the second breath and/or third breath). In some embodiments, in accordance with a determination that the second breath meets the set of one or more criteria, the computer system moves the plurality of particles based on the breath information detected for the second breath (and not based on breath information detected for the first breath and/or third breath). In some embodiments, in accordance with a determination that the third breath does not meet the set of one or more criteria, the computer system moves (e.g., in the simulated three-dimension environment) the plurality of particles based on the breath information detected for the first breath and the second breath and not based on breath information detected for the third breath. Moving the plurality of particles based on the breath information detected for the first breath in accordance with a determination that the first breath meets a set of one or more criteria performs an operation when a condition is met without requiring further user input and reducing the number of inputs required to perform an operation. Moving the plurality of particles based on the breath information detected for the second breath in accordance with a determination that the second breath meets a set of one or more criteria performs an operation when a condition is met without requiring further user input and reducing the number of inputs required to perform an operation. Moving the plurality of particles based on the breath information detected for the first breath and the second breath, and not based on breath information for the third breath, in accordance with a determination that the third breath does not meet a set of one or more criteria performs an operation when a condition is met without requiring further user input and reducing the number of inputs required to perform an operation.

In some embodiments, the condition includes a determination that a set of one or more criteria corresponding to a high confidence level (e.g., a high likelihood that the detected breath information corresponds to the user's actual breath) is met. In some embodiments, the condition includes not meeting a set of one or more criteria corresponding to a low confidence level (e.g., a low likelihood that the detected breath corresponds to the user's actual breath and/or a high likelihood that the detected breath does not correspond to the user's actual breath). Moving the plurality of particles based on detected breath information in accordance with a determination that a respective breath meets a set of one or more criteria corresponding to a high confidence level being met performs an operation when a condition is met without requiring further user input and reducing the number of inputs required to perform an operation.

In some embodiments, the set of one or more criteria corresponding to a high confidence level includes a determination that the detected breath information is within (and/or not outside) expected bounds (e.g., bounds for a typical breath) for a first number of calculation cycles (e.g., for the current breath, for multiple periods of time during the current breath, and/or a predetermined number of preceding breaths). In some embodiments, a set of one or more criteria corresponding to low confidence includes a determination that the detected breath information is outside expected bounds for the first number of calculation cycles. In some embodiments, the expected bounds are determined, at least in part, based on an average of previously detected breaths. In some embodiments, the expected bounds are determined, at least in part, based on a user selection (e.g., user selecting a breath rate of 4 breaths per minute, 6 breaths per minute, or 11 breaths per minute). Moving the plurality of particles based on detected breath information in accordance with a determination that the detected breath information is within expected bounds for a first number of calculation cycles performs an operation when a condition is met without requiring further user input and reducing the number of inputs required to perform an operation.

In some embodiments, a set of one or more criteria corresponding to a low confidence level (or, in some embodiments, corresponding to the high confidence level not being met) includes a determination that the detected breath information is outside the expected bounds for a second number of calculation cycles, wherein the second number of calculation cycles is less than the number of calculation cycles (e.g., fewer number of calculation cycles are required to meet the low confidence criteria than are required to meet the high confidence criteria). In some embodiments, the low confidence criteria include a determination that the most recent 3 breaths were outside the expected bounds. In some embodiments, the high confidence criteria include a determination that the most recent 10 breaths were inside the expected bounds. Moving the plurality of particles based on detected breath information in accordance with determination that the detected breath information is outside the expected bounds for a second number of calculation cycles performs an operation when a condition is met without requiring further user input and reducing the number of inputs required to perform an operation.

In some embodiments, for a fourth breath (e.g., a fourth breath cycle and/or a portion thereof), a determination is made regarding whether the set of one or more criteria corresponding to the high confidence level is met. In some embodiments, for a fifth breath (e.g., a fifth breath cycle and/or a portion thereof), a determination is made regarding whether the set of one or more criteria corresponding to the high confidence level is met. In some embodiments, the computer system repeatedly (e.g., in phase) determines whether the set of one or more criteria corresponding to the high confidence level is met. Determining, for respective breathes, whether the set of one or more criteria corresponding to the high confidence level is met enables the computer system to determine (e.g., on a breath-by-breath basis) whether to move the plurality of particles based the breath information for the current breath or based on the breath information for the plurality of breaths, which enables the computer system to move the plurality of particles to more accurately represent the user's breath, thereby providing improved visual feedback and an improved user experience.

In some embodiments, the breath information that is detected for the plurality of breaths includes at least one of in-breath information (e.g., speed, duration, and/or rate of an inhale), in-breath hold information (e.g., duration and/or length of a pause between an inhale and a subsequent exhale), out-breath information (e.g., speed, duration, and/or rate of an exhale), and out-breath hold information (e.g., duration and/or length of a pause between an exhale and a subsequent inhale). Detecting breath information that includes in-breath information, in-breath hold information, out-breath information, and/or out-breath hold information enables the computer system to move the plurality of particles to more accurately represent the user's breath, thereby providing improved visual feedback and an improved user experience.

In some embodiments, moving the plurality of particles (e.g., 730) based on the breath information for the plurality of breaths includes moving (e.g., in a simulated three-dimension environment) the plurality of particles based on a calculated average (e.g., an average over the previous 3 breaths and/or an average over the previous 3 breaths meeting the high confidence criteria) of at least one of in-breath information (e.g., speed, duration, and/or rate of an inhale), in-breath hold information (e.g., duration and/or length of a pause between an inhale and a subsequent exhale), out-breath information (e.g., speed, duration, and/or rate of an exhale), and out-breath hold information (e.g., duration and/or length of a pause between an exhale and a subsequent inhale). Moving the plurality of particles based on a calculated average of in-breath information, in-breath hold information, out-breath information, and/or out-breath hold information enables the computer system to move the plurality of particles to more accurately represent the user's breath, thereby providing improved visual feedback and an improved user experience.

In some embodiments, moving the plurality of particles (e.g., 730) based on the breath information for the plurality of breaths includes moving (e.g., in a simulated three-dimension environment) the plurality of particles based on an average breath value that is calculated for a predetermined number of breath cycles (e.g., 3 breath cycles or 4 breath cycles) in the plurality of breaths. In some embodiments, an average breath value is calculated over a predetermined number of breath cycles. In some embodiments, the average breath value is calculated for a portion of a breath (e.g., an in-breath, an in-breath hold, an out-breath, and/or an out-breath hold). Moving the plurality of particles based on an average breath value that is calculated for a predetermined number of breath cycles enables the computer system to move the plurality of particles to more accurately represent the user's breath, thereby providing improved visual feedback and an improved user experience.

In some embodiments, moving the plurality of particles (e.g., 730) based on the breath information for the plurality of breaths includes moving (e.g., in a simulated three-dimension environment) the plurality of particles based on an average breath value that is calculated for a predetermined number of breath cycles (e.g., 3 breath cycles or 4 breath cycles), in the plurality of breaths, that meet a set of one or more criteria corresponding to a high confidence level. In some embodiments, average breath information is calculated for a predetermined number of the preceding breaths that meet high confidence criteria. Moving the plurality of particles based on an average breath value that is calculated for a predetermined number of breath cycles that meet the set of one or more criteria corresponding to a high confidence level enables the computer system to move the plurality of particles to more accurately represent the user's breath, thereby providing improved visual feedback and an improved user experience.

In some embodiments, the breath information is detected via one or more camera sensors (e.g., 704-1, 704-2, 6-114, 6-116, and/or camera sensors directed towards the user of the computer system). Detecting breath information via one or more camera sensors enables the computer system to gather breath information for a plurality of breaths in order to move the plurality of particles based on the detected breath information.

In some embodiments, the one or more camera sensors (e.g., 704-1 and/or 704-2) detect, during a breath cycle, movement of the chest area and/or stomach area of the user (e.g., 720) (e.g., expansion and contraction of the user's chest and/or stomach). Detecting movement of the chest area and/or stomach area of the user enables the computer system to gather breath information for a plurality of breaths in order to move the plurality of particles based on the detected breath information.

In some embodiments, the breath information is detected via one or more microphone sensors (e.g., 706). In some embodiments, microphones detect the sounds of the user breathing in and out. Detecting breath information via one or more microphone sensors enables the computer system to gather breath information for a plurality of breaths in order to move the plurality of particles based on the detected breath information.

In some embodiments, the plurality of particles (e.g., 730) are displayed in a perceived distance in a simulated three-dimension environment in front of (e.g., beyond) the user (e.g., 720) of the computer system. In some embodiments, the particles are perceived to be a short way (e.g., 2 feet or 3 feet) in front of the user. In some embodiments, the plurality of particles expand (e.g., move apart of from another) (e.g., during the user's inhale) and some of the particles appear to approach the user and/or pass the user. Displaying the plurality of particles in a perceived distance in front of the user minimizes the perceived lag between the user's actual breath and the computer system moving the plurality of particles on the display, allowing the movement of the plurality of particles to seem to naturally coincide with the user's breath, thereby providing the user with improved visual feedback and an improved user experience.

In some embodiments, the plurality of particles (e.g., 730) includes a first set of one or more particles that are perceived in a near distance (e.g., particles that appear close to the user) and a second set of one or more particles that are perceived in a far distance (e.g., particles that appear farther away from the user than the first set of one or more particles). In some embodiments, in response to detecting breath information for at least the portion of the current breath, the first set of one or more particles move (e.g., based on and/or in response to a user's breath) before (e.g., sooner than) the second set of one or more particles. Moving the first set of one or more particles before the second set of one or more particles in response to detecting breath information for at least the portion of the current breath performs an operation when a condition is met without requiring further user input and reducing the number of inputs required to perform an operation.

In some embodiments, moving the plurality of particles (e.g., 730) based on the breath information for the current breath includes moving the plurality of particles based on a length of the current breath (and, optionally, not based on a speed of the current breath). Moving the plurality of particles based on a length of the current breath enables the computer system to move the plurality of particles with a consistent speed from breath cycle to breath cycle, which allows for a slower and more calming movement, thereby providing an improved user experience.

In some embodiments, moving the plurality of particles (e.g., 730) based on the length of the current breath includes moving a respective particle a first distance (e.g., a shorter distance) based on (e.g., in response to) a breath with first duration (e.g., a shorter duration). In some embodiments, moving the respective particle a second distance (e.g., a longer distance) based on (e.g., in response to) a breath with a second a duration (e.g., a longer duration), wherein the second distance is farther than the first distance and wherein the second duration is longer than the first duration. Moving a respective particle a further distance based on a longer breath and moving the respective particle a shorter distance based on a shorter breath enables the computer system to move the plurality of particles with a consistent speed from breath cycle to breath cycle, which allows for a slower and more calming movement, thereby providing an improved user experience.

In some embodiments, the computer system is in communication with one or more speakers and, in response to detecting breath information for at least the portion of the current breath, the computer system plays, via the one or more speakers, an audio output (e.g., tone(s), music, and/or guided audio meditation) corresponding to the detected breath information. Playing an audio output corresponding to the detected breath information in response to detecting breath information for at least a portion of the current breath performs an operation when a condition is met without requiring further user input and reducing the number of inputs required to perform an operation.

In some embodiments, aspects/operations of methods 800 and 900 may be interchanged, substituted, and/or added between these methods. For example, user interfaces for breath tracking can display particles with lighting characteristics that change over time and that move based on a condition being met. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of displaying user interfaces for breath tracking, the present technology can be configured to allow users to select to "opt in" or "opt out" of participation in the collection of personal information data during registration for services or anytime thereafter. In another example, users can select not to provide data for breath tracking. In yet another example, users can select to limit the length of time data is maintained or entirely prohibit the sharing of breath information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components and one or more input devices, the computer system comprising:

one or more processors; and memory storing one or more programs configured to be executed by the one or more processors, the one or more programs including instructions for:

detecting, via the one or more input devices, breath information for a user of the computer system; and displaying, via the one or more display generation components, a plurality of particles that move based on the detected breath information, including:

in accordance with a determination that a first particle of the plurality of particles moves with a magnitude of movement that is above a first movement threshold, changing, over time, a lighting characteristic of the first particle based on the magnitude of movement of the first particle;

in accordance with a determination that the first particle moves with a magnitude of movement that is below the first movement threshold, maintaining the lighting characteristic of the first particle; and changing, over time, a lighting characteristic of a second particle of the plurality of particles, different from the first particle, based on a magnitude of movement of the second particle.

2. The computer system of claim 1, wherein changing the lighting characteristic of the first particle includes changing a brightness of the first particle.

3. The computer system of claim 1, wherein:

changing, over time, the lighting characteristic of the first particle of the plurality of particles based on the magnitude of movement of the first particle includes:

in accordance with a determination that the magnitude of movement of the first particle is above a second movement threshold, increasing the lighting characteristic of the first particle; and in accordance with a determination that the magnitude of movement of the first particle is below the second movement threshold, decreasing the lighting characteristic of the first particle.

4. The computer system of claim 1, wherein:

changing, over time, the lighting characteristic of the first particle of the plurality of particles based on the magnitude of movement of the first particle includes:

in accordance with a determination that the first particle is moving at a first rate, displaying the lighting characteristic of the first particle at a first level; and in accordance with a determination that the first particle is moving at a second rate different from the first rate, displaying the lighting characteristic of the first particle at a second level different from the first level.

5. The computer system of claim 1, the one or more programs further including instructions for:

changing the first particle in a first manner and changing the second particle in a second manner different from the first manner, wherein the change to the first particle and the change to the second particle are based on the detected breath information.

6. The computer system of claim 5, wherein the change in the lighting characteristic of the first particle is independent from the change in the lighting characteristic of the second particle.

7. The computer system of claim 1, the one or more programs further including instructions for:

moving the first particle with a first variation and moving the second particle with a second variation different from the first variation.

8. The computer system of claim 1, wherein the plurality of particles appear to move, based on the detected breath information, in a spherical pattern.

9. The computer system of claim 8, wherein the first particle is located closer to the center of the spherical pattern than the second particle and wherein a magnitude of movement of the first particle is greater than a magnitude of movement of the second particle.

10. The computer system of claim 1, the one or more programs further including instructions for:

changing, over time, a color of the first particle based on the magnitude of movement of the first particle; and changing, over time, a color of the second particle based on the magnitude of movement of the second particle.

11. A non-transitory computer-readable storage medium storing one or more programs configured to be executed by one or more processors of a computer system that is in communication with one or more display generation components and one or more input devices, the one or more programs including instructions for:

detecting, via the one or more input devices, breath information for a user of the computer system; and displaying, via the one or more display generation components, a plurality of particles that move based on the detected breath information, including:

in accordance with a determination that a first particle of the plurality of particles moves with a magnitude of movement that is above a first movement threshold, changing, over time, a lighting characteristic of the first particle based on the magnitude of movement of the first particle;

in accordance with a determination that the first particle moves with a magnitude of movement that is below the first movement threshold, maintaining the lighting characteristic of the first particle; and changing, over time, a lighting characteristic of a second particle of the plurality of particles, different from the first particle, based on a magnitude of movement of the second particle.

12. The non-transitory computer-readable storage medium of claim 11, wherein changing the lighting characteristic of the first particle includes changing a brightness of the first particle.

13. The non-transitory computer-readable storage medium of claim 11, wherein:

changing, over time, the lighting characteristic of the first particle of the plurality of particles based on the magnitude of movement of the first particle includes:

in accordance with a determination that the magnitude of movement of the first particle is above a second movement threshold, increasing the lighting characteristic of the first particle; and in accordance with a determination that the magnitude of movement of the first particle is below the second movement threshold, decreasing the lighting characteristic of the first particle.

14. The non-transitory computer-readable storage medium of claim 11, wherein:

changing, over time, the lighting characteristic of the first particle of the plurality of particles based on the magnitude of movement of the first particle includes:

in accordance with a determination that the first particle is moving at a first rate, displaying the lighting characteristic of the first particle at a first level; and in accordance with a determination that the first particle is moving at a second rate different from the first rate, displaying the lighting characteristic of the first particle at a second level different from the first level.

15. The non-transitory computer-readable storage medium of claim 11, the one or more programs further including instructions for:

changing the first particle in a first manner and changing the second particle in a second manner different from the first manner, wherein the change to the first particle and the change to the second particle are based on the detected breath information.

16. The non-transitory computer-readable storage medium of claim 15, wherein the change in the lighting characteristic of the first particle is independent from the change in the lighting characteristic of the second particle.

17. The non-transitory computer-readable storage medium of claim 11, the one or more programs further including instructions for:

moving the first particle with a first variation and moving the second particle with a second variation different from the first variation.

18. The non-transitory computer-readable storage medium of claim 11, wherein the plurality of particles appear to move, based on the detected breath information, in a spherical pattern.

19. The non-transitory computer-readable storage medium of claim 18, wherein the first particle is located closer to the center of the spherical pattern than the second particle and wherein a magnitude of movement of the first particle is greater than a magnitude of movement of the second particle.

20. The non-transitory computer-readable storage medium of claim 11, the one or more programs further including instructions for:

changing, over time, a color of the first particle based on the magnitude of movement of the first particle; and changing, over time, a color of the second particle based on the magnitude of movement of the second particle.

21. A method, comprising:

at a computer system that is in communication with one or more display generation components and one or more input devices:

detecting, via the one or more input devices, breath information for a user of the computer system; and displaying, via the one or more display generation components, a plurality of particles that move based on the detected breath information, including:

in accordance with a determination that a first particle of the plurality of particles moves with a magnitude of movement that is above a first movement threshold, changing, over time, a lighting characteristic of the first particle based on the magnitude of movement of the first particle;

in accordance with a determination that the first particle moves with a magnitude of movement that is below the first movement threshold, maintaining the lighting characteristic of the first particle; and changing, over time, a lighting characteristic of a second particle of the plurality of particles, different from the first particle, based on a magnitude of movement of the second particle.

22. The method of claim 21, wherein changing the lighting characteristic of the first particle includes changing a brightness of the first particle.

23. The method of claim 21, wherein:

changing, over time, the lighting characteristic of the first particle of the plurality of particles based on the magnitude of movement of the first particle includes:

in accordance with a determination that the magnitude of movement of the first particle is above a second movement threshold, increasing the lighting characteristic of the first particle; and in accordance with a determination that the magnitude of movement of the first particle is below the second movement threshold, decreasing the lighting characteristic of the first particle.

24. The method of claim 21, wherein:

changing, over time, the lighting characteristic of the first particle of the plurality of particles based on the magnitude of movement of the first particle includes:

in accordance with a determination that the first particle is moving at a first rate, displaying the lighting characteristic of the first particle at a first level; and in accordance with a determination that the first particle is moving at a second rate different from the first rate, displaying the lighting characteristic of the first particle at a second level different from the first level.

25. The method of claim 21, further comprising:

changing the first particle in a first manner and changing the second particle in a second manner different from the first manner, wherein the change to the first particle and the change to the second particle are based on the detected breath information.

26. The method of claim 25, wherein the change in the lighting characteristic of the first particle is independent from the change in the lighting characteristic of the second particle.

27. The method of claim 21, further comprising:

moving the first particle with a first variation and moving the second particle with a second variation different from the first variation.

28. The method of claim 21, wherein the plurality of particles appear to move, based on the detected breath information, in a spherical pattern.

29. The method of claim 28, wherein the first particle is located closer to the center of the spherical pattern than the second particle and wherein a magnitude of movement of the first particle is greater than a magnitude of movement of the second particle.

30. The method of claim 21, further comprising:

changing, over time, a color of the first particle based on the magnitude of movement of the first particle; and changing, over time, a color of the second particle based on the magnitude of movement of the second particle.

* * * * *